United States Patent [19]

Godai et al.

[11] 4,336,441
[45] Jun. 22, 1982

[54] WELDING PROCESS

[75] Inventors: Tomokazu Godai; Tohru Sugiyama, both of Kamakura; Yutaka Nishikawa, Fujisawa, all of Japan

[73] Assignee: Kobe Steel, Ltd., Kobe, Japan

[21] Appl. No.: 84,829

[22] Filed: Oct. 15, 1979

[30] Foreign Application Priority Data

Oct. 27, 1978 [JP] Japan .............................. 53/133005
Jul. 7, 1979 [JP] Japan .............................. 54/086299

[51] Int. Cl.³ ............................................. B23K 35/00
[52] U.S. Cl. ......................... 219/137 WM; 219/123; 219/124.03; 219/146.23
[58] Field of Search ........... 219/137 R, 137 WM, 123, 219/124.03, 146.23

[56] References Cited

U.S. PATENT DOCUMENTS

| | | | |
|---|---|---|---|
| 2,868,954 | 1/1959 | Skinner et al. | 219/137 R |
| 3,195,230 | 7/1965 | Peck et al. | 219/146.1 |
| 3,274,371 | 9/1966 | Manz et al. | 219/137 R |
| 3,336,460 | 8/1967 | Hauck et al. | 219/123 |
| 3,368,887 | 2/1968 | Enis et al. | 219/137 WM |
| 3,549,856 | 12/1970 | Saenger, Jr. | 219/123 |
| 3,602,689 | 8/1971 | Heuschkel | 219/146.1 |
| 3,627,974 | 12/1971 | Normando | 219/137 PS |
| 3,825,712 | 7/1974 | Gibbs | 219/123 |
| 3,902,039 | 8/1975 | Lang | 219/146.1 |
| 3,924,092 | 12/1975 | Lessmann et al. | 219/123 |
| 3,989,921 | 11/1976 | Ohi et al. | 219/124.03 |
| 4,068,113 | 1/1978 | Godai et al. | 219/137 WM |
| 4,087,674 | 5/1978 | Kohira et al. | 219/146.1 |
| 4,120,440 | 10/1978 | Kirkwood et al. | 219/146.1 |
| 4,145,594 | 3/1979 | Koshiga et al. | 219/123 |

FOREIGN PATENT DOCUMENTS

| | | |
|---|---|---|
| 1375305 | 9/1964 | France . |
| 2078555 | 5/1971 | France . |
| 45-39931 | 12/1970 | Japan . |
| 49-55538 | 5/1974 | Japan . |
| 49-66548 | 6/1974 | Japan . |

OTHER PUBLICATIONS

Quinn et al., "Fracture Characteristics and Mechanical Properties of 9% Nickel Steel Welded with Ferritic Filler", Welding Research International, vol. 8, 1978, #5, pp. 379–408.

Witherell and Peck, "Progress in Welding 9% Nickel Steel", Welding Journal Research Supplement, vol. 43, Nov. 1964, No. 11, pp. 473-S–480-S.

Primary Examiner—C. C. Shaw
Attorney, Agent, or Firm—Oblon, Fisher, Spivak, McClelland & Maier

[57] ABSTRACT

A welding method for welding a base metal with a welding wire of specified alloy composition using a TIG welding process, automatically controlling an arc length between a nonconsumable electrode and the base metal, deflecting the arc forward in the welding advance direction by the influence of magnetic fields resulting from DC current flow through the welding wire to prevent arc blow, weaving the arc forward in the welding advance direction by pulsating the current flowing through the weld wire, and heat treating a final weld layer with the nonconsumable electrode.

22 Claims, 30 Drawing Figures

WELDING PROCESS

BACKGROUND OF THE INVENTION

1. Field of the Invention

This invention relates to a welding process using an eutectic alloy wire suitable for welding a superlow-temperature steel such as 9% nickel steel.

2. Description of the Prior Art

9% nickel steel is a high tensile steel which may be used at a superlow temperature up to $-196°$ C. The tensile strength of the 9% nickel steel is defined to be on the order of 70.3–84.4 kg/mm$^2$ according to the ASTM standard, A353 (NNT material) and A553 (QT material), and the yield point (0.2% yield strength) higher than 52.7 kg/mm$^2$ and higher than 59.8 kg/mm$^2$ according to A353 and A553. The ASTM standard also requires that the impact value thereof be greater than 3.5 kg-m at $-196°$ C. A further requirement of the ASTM standard, case 1308-5, when construction of a building is accomplished by welding the 9% nickel steel, is that the tensile strength of a joint including a base metal material be higher than 66.8 kg/mm$^2$ and lower than that of the base metal material per se in order to assure joint performances when annealing is not carried out as a welding condition for the removal of stress.

In recent years, however, there has been a strong desire for the development of joints of tensile strength well above the standard value as defined by the case 1308-5 and welding materials of a strength not less than that of the base metal material for increasing stress at time of design for welding. As is obvious from the ASTM standard, proper strength and low-temperature toughness of the 9% nickel steel is obtainable from heat treatment but in the case of large building construction, for example, a storage tank, such heat treatment is substantially impossible after completion of the construction. To this end the construction is made serviceable for welding conditionings.

While it is most desirable to use a welding wire whose composition is identical to that of the base material for welding the 9% nickel steel, high nickel alloy wires as defined by the AWSA standard, 5.11 ENiCrFe.1-3, etc., are very often actually used for welding because there are difficulties in obtaining stable low-temperature toughness of the 9% nickel steel wire. While joints made through use of the high nickel welding wire exhibit excellent toughness at a temperature of $-196°$ C. after welding, they undergo very small tensile strength (particularly, 0.2% yield strength) as compared to that of the base metal material. No matter when the 9% nickel steel or a 70 kg/mm$^2$ high tensile steel is used, the strength of the joints is low so that weld design stress should be low and the overall construction welded should be thick. The conventional welding method fails to take full advantage of the strength property of the 9% nickel steel and, in fact, suffers from twofold uneconomical expenditures, an increased thickness of the construction welded and an increased amount of expensive high nickel alloy welding wire consumed. Welding by the high nickel alloy is further disadvantageous due to the experiencing of hot cracks and thermal fatigue due to a difference between the coefficients of thermal expansion, thus requiring laborsome welding procedures.

For these reasons 9% nickel steel is severely limited in application while showing excellent performances as a superlow-temperature steel.

SUMMARY OF THE INVENTION

With the foregoing in mind, it is an object of the present invention to provide a welding process using a welding wire having stable low-temperature toughness comparable with that of conventional high nickel alloy welding wire and strength comparable with that of 9% nickel steel, ensuring more stable performance.

BRIEF DESCRIPTION OF THE DRAWINGS

For a more complete understanding of the present invention and for further objects and advantages thereof, reference is now made to the following description taken in conjunction with the accompanying drawings, in which:

FIG. 1 is a block diagram of an embodiment of the present invention constructed for controlling arc length, while

FIG. 4 is a graph showing input versus output characteristics of the example of FIG. 3;

FIGS. 12 A–E are waveform diagrams of pulsating current, while

FIGS. 12F and 12G show alternate embodiments of the present invention;

DETAILED DESCRIPTION OF THE PREFERRED EMBODIMENTS

Figures 1, 4:
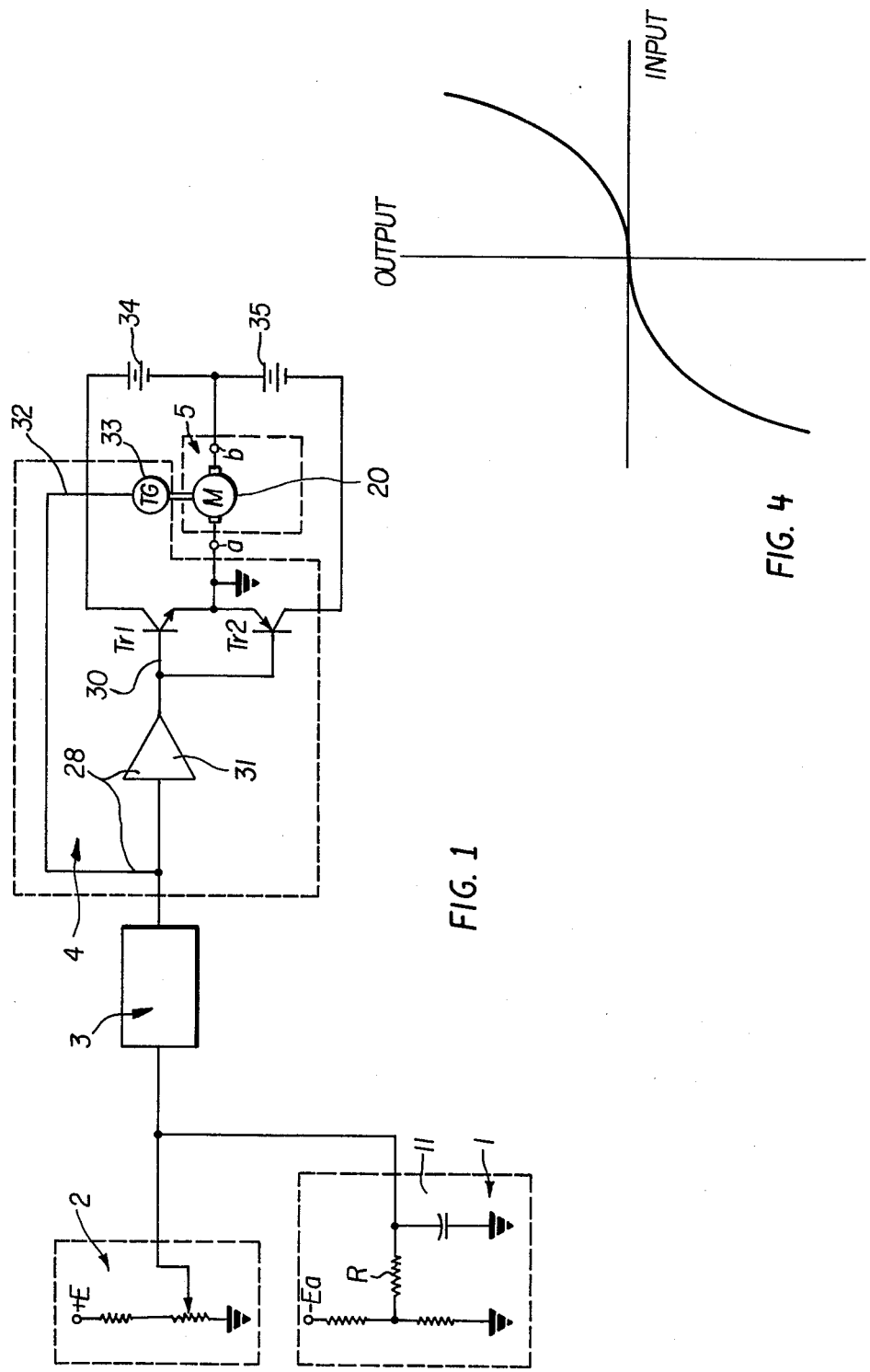

The present invention achieves the above discussed objectives by providing a wire the composition of which is as follows wherein % means % by weight: The welding wire according to the major features of the present invention essentially includes 8–15% of nickel and 0.1–0.8% of manganese or essentially includes, in addition to those ingredients, less than 0.15% of silicon, less than 0.1% of carbon, less than 0.1% of aluminum and less than 0.1% of titanium. It further includes less than 0.0006% of boron, less than 100 ppm of oxygen, and less than 100 ppm of nitrogen. The following detailed description will first set forth the wire and then a welding process using the wire. Although the wire embodying the present invention is applicable to the TIG welding method and the TIG plasma arc welding method, they may be called simply as "the TIG welding method", "TIG welding wire", etc. hereinafter.

The TIG welding wire according to the present invention is less expensive than any high nickel alloy welding wire and is free from the various problems with high nickel alloy wires as discussed above, thus providing joints which have excellent low-temperature toughness, tensile strength, etc. This makes it possible to substantially reduce the thickness of an overall construction welded, take full advantage of the inherent properties of the 9% nickel steel and expand applications of the 9% nickel steel. Although the foregoing has discussed the problems in welding the 9% nickel steel, a typical example of superlow-temperature steels, it is understood that the present invention is applicable to not only 9% nickel steel but also lower-grade nickel steels such as 5.5% nickel steel and 3.5% nickel steel.

Since as stated above the wire according to the present invention is required to exhibit excellent low-temperature toughness in welding superlow temperature steel such as the 9% nickel steel, the content of such a deoxidizer as Al, Ti, Mn and Si is severely limited. In the case of welding materials containing a very small amount of the deoxidizer, more than 100 ppm oxygen in the weld metal leads to the possibility of such weld defects as blow holes and has adverse effects on low-temperature toughness. On the other hand, oxides in fluxes are generally reduced in the shielded arc welding method and the submerged arc welding method and an active gas ($CO_2$ or $O_2$) which is slightly mixed into a shield gas for arc stabilization is also reduced in the MIG welding method. In any case it is difficult to limit the oxygen content of the weld metal below 100 ppm. However, since the TIG welding method uses neither oxides as welding material nor active gas in the shield gas, it can provide a weld joint which is free of joint defects at a superlow temperature of $-196°$ C. and excellent in low-temperature toughness and other mechanical strengths, by using the welding wire and the base metal material which will be detailed with respect to the compound thereof.

As briefly described above, the welding wire according to the present invention includes 8-15% nickel by weight and 0.1-0.8% manganese by weight, less than 0.15% silicon, less than 0.1% carbon, less than 0.1% aluminum, less than 0.1% titanium, less than 0.0006% boron, less than 100 ppm oxygen and less than 100 ppm nitrogen. Nickel is essential in ensuring low-temperature toughness as in the case of high nickel steels used with the wire of the present invention. Less than 8% of nickel results in failure to afford sufficient low-temperature toughness to the joints. More than 15% of nickel, on the other hand, makes the mechanical strength of the joints too high and brings forth a remarkable reduction in ductility with the results that an unstable residual austinite is developed and then transformed into the martensitic structure at a superlow temperature to thereby decrease low-temperature toughness. While Mn is very effective in improving weldability and as a deoxidizer and a sulfur captor, less than 0.1% amount of Mn impairs greatly weldability and tends to develop blow holes, etc., in the joints due to lack of deoxidization. Accordingly, in this case the effects of Mn is not expected. For Mn in excess of 0.8% there is a trend to develop an unstable residual austinite and deteriorate low-temperature toughness to a great extent.

The silicon content should be smaller than 0.15% since silicon improves weldability and serves as a deoxidizer but on the other hand lowers low-temperature toughness and remarkably increases susceptibility to hot cracks. While only a small amount of carbon is enough to enhance tensile strength, the carbon content should be less than 0.1% so as to not decline low-temperature toughness. Aluminum and titanium are both required to be added at less than 0.1% since both are effective as a deoxidizer and in preventing the occurrence of blow holes, etc. but the former impairs significantly crack resilience and the latter accompanies a substantial decline in low-temperature toughness due to precipitation hardening of titanium carbite.

The results of the inventors' experiments indicate that boron is very detrimental in ensuring excellent low-temperature toughness at a superlow temperature when the welding wire of the above defined compound is used. If the boron content exceeds 0.0006%, then the wire is more susceptible to hot cracks, easier to harden and more tough at low temperatures. For the purpose of the present invention it is most preferable that the boron content be zero and as a practical matter, the boron content should be at least less than 0.0006%. It is well known that boron is mixed as an impurity into iron system materials such as electrolytic iron, one of the chief ingredients of the wire and its content may sometimes exceed 0.02% with the electrolytic iron containing the least amount of impurities. In the case where a substantial amount of boron is mixed with the material, the vacuum degassing solution method would be unsuccessful in removing the boron. Pursuant to the teachings of the present invention, the boron content of the starting material should be severely governed and the starting material selected such that the boron content of the welding wire does not exceed 0.0006%, preferably 0.0004%. It was not until the inventors' findings that such adverse effects of boron were unveiled. Even though ingredients other than boron are within the above defined ranges, it is by no means easy to achieve the objects of the present invention so long as the boron content fails to meet the requirement.

Since oxygen causes oxides to be deposited on a grain boundary or the like, it is necessary to control the oxygen content of the welding wire such that oxygen amounts to less than 100 ppm within the weld metal, while it is therefore recommended to keep the oxygen content of the welding wire below 100 ppm. Since the oxygen in the weld metal is correlated with not only the oxygen in the welding wire but also the counterpart in the base metal, the oxygen content of the base metal should be as small as possible for the purpose of the present invention. The results of the inventors' experiments also indicate that the oxygen content of the base metal should be less than 100 ppm and a total of the oxygen content of the wire and the double oxygen content of the base metal be less than 200 ppm in order to attain the objects of the present invention. Why the oxygen content of the base metal should be less than 100 ppm is due to the fact that the oxygen in the base metal is hardly affected by the deoxidizing activity of the deoxidizer contained within the welding wire and difficult to remove in the progress of the welding process.

Finally, nitrogen has the properties of precipitating nitrides in the weld metal and deteriorating significantly low-temperature toughness. It follows that the nitrogen content of the welding wire should be smaller than 100 ppm. Since the nitrogen in the weld metal has a correlation with both the nitrogen in the welding wire and in the base metal, the nitrogen content should be as small as possible for the purpose of the present invention. The inventors' experiments proved that the nitrogen content of the base metal should not exceed 100 ppm nor the sum of the nitrogen content of the wire and the double nitrogen content of the base metal exceed 200 ppm in order to attain the objects of the present invention.

FIGS. 16, 17, 13 and 14 are graphs showing that the "V" notch absorption energy falls below 80 J at −196° C. in the presence of more than 100 ppm oxygen and more than 100 ppm nitrogen and that the oxygen and nitrogen contents need to be smaller than 100 ppm. When the sum of each gas content of the wire and double each gas content of the base metal is more than 200 ppm the "V" notch energy falls below 80 J at −196° C.

Since as noted above the welding wire according to the present invention is allowed to contain only extremely small amounts of oxygen and nitrogen along with a very small amount of deoxidizer, it is most desirable to apply the vacuum degassing solution method to prevent mixture of oxygen and nitrogen. It is evident from the foregoing that the present invention is aimed at using super low-temperature steels as the base metal material and the most significant advantages of the present invention are assured when low-temperature steels containing nickel in the range of 3.5-9.5%, for example, 9% nickel steel, 5.5% nickel steel and 3.5% nickel steel, are used as the base metal material.

Supposing that the TIG welding method is carried out, the present invention makes it possible to provide joints bearing tensile strength and low-temperature toughness comparable with those of low-temperature steels such as 9% nickel steel by defining the compound of the welding wire and more particularly the ceiling contents of boron, oxygen and nitrogen. The welding wire according to the present invention has substantially the same compound as the base metal material and thus provides joints which are free from problems such as thermal fatigue due to differences between coefficients of thermal expansion and hot cracks and exhibit very high mechanical strengths. It is accompanied by economical welding construction which is designed with permissible lowest stresses while taking advantage of the properties of the low-temperature steels.

The foregoing has set forth in detail the compound of the welding wire, the oxygen and nitrogen content of the base metal material which are defined to make sure the performances of the welding wires, and the critical values thereof in taking the oxygen and nitrogen contents of the wire into consideration. If these requirements are fulfilled, then joints which are excellent in both low-temperature toughness and tensile strength are available anywhere in a weld metal zone, a bond zone and a heat-affected zone (HAZ) through the TIG welding method or the TIG plasma arc welding method. A welding process according to the present invention will now be described together with its welding conditions.

Shield gas is of great importance in carrying out the TIG welding method or the TIG plasma welding method. A pure inert gas such as pure Ar or pure He is employed in the welding process of the present invention as in the conventional procedure. Since the oxygen and nitrogen contents of the wire and the base metal material are limited as discussed above according to the present invention, the advantages of use of pure inert gas are enjoyable to the greatest extent. Since the welding process according to the present invention belongs to the TIG welding method or the TIG plasma welding method, the wire embodying the present invention may be defined in terms of a filler material throughout the following description and the appended claims.

Automatic adjustment for the length of an arc developed between a nonconsumable electrode and the base metal material will be set forth as a first condition for the TIG welding method.

In order to gain a homogeneous welding result using the automatic arc welding method of the nonconsumable electrode type, it is necessary to maintain a constant arc length at all times irrespective of torch electrode moving method and groove shape and to hold in a homogenous liquid phase the welding material being supplied automatically. When the nonconsumable electrode type automatic arc welding method is to be conducted in every position, it is desirable to weave the torch in such a manner as to make the surface of beads even and minimize internal defects. Failure to control the arc length accurately would result in concave-convex configurations in the grooves or in underlaying weld beads in the case of multi-layer welding and misalignment between the weaving movement and the grooves. Consequently, the arc length is varied and, when the arc becomes too short, the nonconsumable electrode may be short-circuited with the base metal with resulting accidents such as the destruction of the electrode and mixture of the electrode material into the weld metal. Moreover, variations in the arc length, that is, variations in the current density of an arc column and in the area occupied by the arc column within a molten pool lead to not only lack of penetration but also an uneven bead configuration due to failure to gain a homogeneous molten pool.

While the filler material is automatically conveyed in the nonconsumable electrode type automatic arc welding method, a slight variation in the arc length causes a variation in the melting speed of the filler wire. Under the circumstance where the beads become uneven and the molten pool is not held at a constant temperature, the result is insufficient or uneven penetration of the filler wire into the molten pool or premature penetration. In the latter case, molten globules fail to move into the molten pool in the normal way in vertical position, overhead position, etc. Particularly, in the case where the nonconsumable electrode type automatic arc welding method is conducted with high alloy steels such as low-temperature steels and stainless steels and nonferrous metals, the above discussed problems are more severe because the shape of the molten pool is easily variable upon even a slight variation in the arc length in conjunction with the melting point of the weld metal and the melting speed of the filler material.

Therefore, in the case of the nonconsumable electrode type automatic arc welding method and particularly overall position weaving welding and welding with high alloy steels and nonferrous metals, it is necessary to keep the arc length at the optimum value very accurately and a measurement to control the arc length is necessary and indispensable.

In the past, an attempt to keep substantially constant the arc length in the nonconsumable electrode type automatic arc welding method was made by sensing and amplifying the arc voltage and moving the electrode forward and backward. The attempt was intended to obviate motor hunting by providing a linear relationship between a motor supply voltage enabling the weld electrode and the arc voltage to have a specific arc voltage range where the motor is not responsive.

Within the specific arc voltage range or a blind zone where the motor is not responsive, the motor stops in different positions between when the arc voltage returns to a stable point in the decreasing process and when in the increasing process. The stable point is dependent on the amplitude of the varying arc voltage and the movement range of the motor is also dependent on the applied voltage thereto, thus presenting difficulties in stopping the motor in a desired fixed position. If the location of the stable operating point is unknown within the blind zone, difficulties are then experienced in adjusting the arc voltage and response relevant to variations in the arc voltage declines by the voltage range of the blind zone.

In view of the foregoing, the conventional method of controlling the arc length in the nonconsumable electrode type automatic arc welding method is practically unsatisfactory for the various welding processes which require accurate arc lengths to achieve uniform fusion of wire being automatically fed and high quality weld zones, for instance, fine welding with high alloy steels and nonferrous metals, weaving welding and overall position welding.

The inventors have conducted studies of those practical problems, devised improved welding machines and applied for patents therefor. Throughout the specification there are disclosed two representative ways of controlling automatically the arc length as follows, either in the TIG welding method of the TIG plasma welding method:

(A) Through the use of an integrator element, a differential voltage between a detected arc voltage and a preset reference voltage is proportionally integrated or multiplied and the resulting signal is used to energize an electrode drive motor, thus automatically precisely controlling the arc length between the nonconsumable electrode and the weld metal; and (B) As an alternative, there is provided an arc voltage detector including an integrator element, a reference voltage setting section, an arc voltage control including an integrator or a multiplier, a motor control including an operator and a polarity decision element, and a drive section for moving the nonconsumable electrode by the motor. The difference between an output voltage of the arc voltage detector and the counterpart of the reference voltage setting section is stabilized through the arc voltage control, appropriately controlling the arc length between the nonconsumable electrode and the weld metal.

A specific embodiment of the present invention will now be set forth by reference to the accompanying drawings. The illustrative embodiment of the present invention (FIG. 1) includes an arc voltage detector 1 including an integrator element 11, a reference voltage setting section 2, an arc voltage control 3 for comparing an arc voltage and a reference voltage for calculation, a motor drive control 4 and a drive section 5 for moving forward and backward a nonconsumable electrode 43 (FIG. 5) according to the arc length by the action of a motor 20.

The arc voltage ($-E_a$) is sensed by the arc voltage detector 1 and stabilized by the integrator element 11 having a time constant greater than its high frequency component and the response rate of the motor. The integrator element may be implemented with a CR integrator or integration operational amplifier with an appropriate gain in relation to an input thereto.

The reference voltage setting section 2 divides a DC constant voltage ($+E$) through a variable resistor, a desirable arc voltage or a desirable arc length being determined by the position of an arm of the variable resistor.

Figure 2:
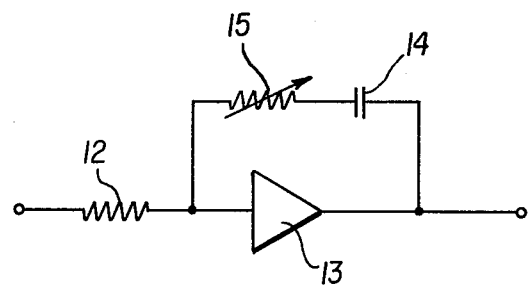
FIG. 2 is a circuit diagram of an example of the arc voltage control method.

The arc voltage control 3 is adapted to linearly integrate and amplify the differential voltage (hereinafter referred to as "error voltage") between the output voltage of the arc voltage detector 1 and the output voltage of the reference voltage setting section 2, which control 3 includes a linear integration amplifier consisting of a resistor 12, an operational amplifier 13, a capacitor 14 and a gain adjusting variable resistor 15, but with the last two elements being in its feedback circuit as shown in FIG. 2.

The linear integration amplifier achieves the integrating and amplifying operation according to the error voltage and then provides the next-stage motor drive control 4 with a signal for regaining the desirable or appropriate arc length in response to only a small variation of the error voltage, thus making sure that welding is effected at the optimum value of the arc voltage.

As described above, the electrode drive motor 20 is braked so as to not operate in the vicinity of its optimum operating point without a work overshoot through utilization of the integrator element 11 and the arc voltage control 3. The problem with hunting is thus avoided altogether.

Figure 3:
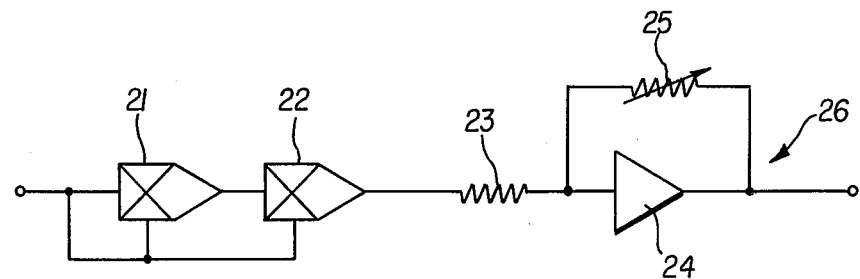
FIG. 3 is a circuit diagram of another example of the arc voltage control method.

As indicated in FIG. 3, a pair of multipliers 21 and 22 within the arc voltage control 3 may bear the "n"th ($n = 2,3,4 \ldots$) power correlation between the input and output thereof. The control 3 includes the two serially connected multipliers 21 and 22 and a coefficient potentiometer 26 next to one of the multipliers 22, the potentiometer 26 comprising a resistor 23, an operational amplifier 24 and a variable resistor 25.

Through the control 3 the error voltage (input) and the arc length control signal (output) applied to the next-stage motor drive control are correlated as depicted by the cubic curve in FIG. 4.

In this manner, the higher the error voltage the greater the output signal applied to the next-stage motor drive control 4. As a result, welding is carried out in the vicinity of the optimum arc length more quickly. The braking torque increases as the optimum arc length is approached. Eventually the arc length rests on the optimum value. Since no excessive output signal is applied to the motor drive control 4 when the error voltage is low, the electrode drive motor 20 becomes operative without hunting in the event that the time-related linear integration method is not relied upon.

The motor drive control 4 amplifies the output signal from the arc voltage control 3 and keeps the electrode drive motor from being overloaded. The electrode drive motor is reversible according to the polarity of the output signal. The control 4 inclues an operator 28 and a next-stage polarity decision element 30.

The operator 28 includes an operational amplifier 31, a feedback element 32 and a tachogenerator 33 for generating an output voltage in proportion to the number of revolutions of the electrode drive motor 20, the output of the tachogenerator being negatively fed back via the feedback element 32 to the input of the operational amplifier 31. The feedback element 32 is to reduce variations in the output of the motor 20 caused by a varying load on the electrode drive motor 20.

Figure 5:
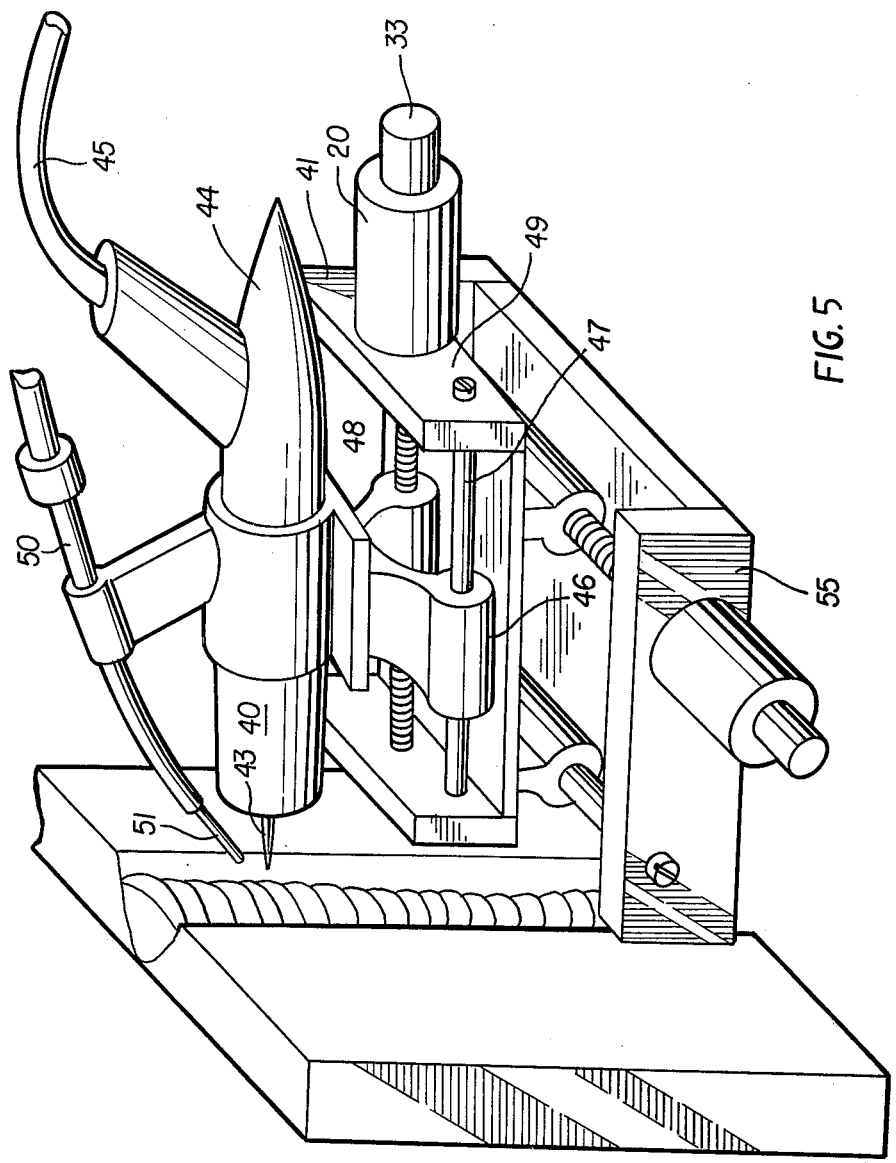
FIG. 5 is a perspective view of a drive section.

The polarity decision element 30 includes an npn transistor $Tr_1$ and a pnp transistor, base terminals of the transistors $Tr_1$ and $Tr_2$ being connected to an output terminal of the operational amplifier 31, a collector terminal of the transistor $Tr_1$ being connected to a terminal b of the electrode drive motor 20 via a power source 34 and the equivalent of the transistor $Tr_2$ also being connected to the terminal b via a different power source 35. Emitter terminals of both the transistors $Tr_1$ and $Tr_2$ are connected to a grounded terminal a of the electrode drive motor 20. When a positive signal is applied to the polarity decision element 30, the transistor $Tr_1$ is conducting so that the electrode drive motor 20 rotates in a positive direction upon current flowing from the terminal a into the terminal b of the electrode drive motor 20. Contrarily, if a negative signal is applied to the polarity decision element 30, then the other transistor $Tr_2$ is conducting so that current flows from the terminal b into the terminal a of the motor 20 to reverse the revolution direction of the motor 20. The drive section 5 includes an electrode section 40 and an electrode driving assembly 41 as shown in FIG. 5. The electrode section 40 contains the nonconsumable electrode 43 and an insulator 44 supporting the electrode 43, the nonconsumable electrode being connected to a weld cable 45 via a lead conductor extending within the insulator. The electrode driving assembly 41 includes electrode support arms 46, a guide level 47 for guiding the arms 46, a screw 48 for thrusting the arms 46 forward and backward and a frame 49 supporting the guide level 47 and the screw 48. The electrode supporting arms 46 has three arms wherein: the first supports the electrode section 40 and supports a welding guide chip 50 at an appropriate angle with respect to the nonconsumable electrode 43; the second has a slide slot of an appropriate dimension wherein a guide bar 47 is slidable; and the third and last carries a male screw in mesh with the screw 48. The screw 48 is coupled with a rotation shaft of the electrode drive motor 20. The filler wire 51 travels within the filler wire guide chip 50. A weaving mechanism 55 is coupled with the frame 49 to weave the nonconsumable electrode 43 to the left or right via the frame 49. In this manner, the drive section 5 travels along a weld line with a suitable traveling device.

As stated above, the arc voltage is sensed by the integrator element having a time constant greater than the high frequency components thereof and the response rate of the motor and the differential voltage between the output of the integrator element and the present reference voltage is applied to the linear integrator or the multiplier and derived therefrom as the motor drive signal so that the electrode drive motor operates without hunting in such a manner as to settle the arc length at the optimum point. Accordingly, the arc length can be preset as desired and settled quickly at the preset value in the nonconsumable electrode type automatic arc welding method irrespective of an uneven weld zone and the configuration of the grooves. This protects the electrode material, provides homogeneous fusion of the filler wire, guarantees high quality of the weld zone and makes possible overall position welding for precise nonconsumable electrode type automatic arc welding with high alloy steels, nonferrous metals, etc.

The above-described method enables automatic control of the arc length. The following description will set forth devices for preventing any magnetic blow when the DC TIG welding method is carried out at a high speed. These devices are unsuitable for the TIG plasma welding method and are applicable only to the TIG welding method in a narrow sense.

The TIG welding method is disadvantageous as follows:

(1) The TIG welding method is mainly intended to fuse the weld metal into the base metal due to heat conduction. The TIG arc itself develops about the molten pool (high temperature portion) without difficulties. If the melting speed is too high, insufficient preheating will cause inferior association (wetness) of the weld metal with the base metal and imperfect fusion of the deposited metal into the base metal.

Figure 6:
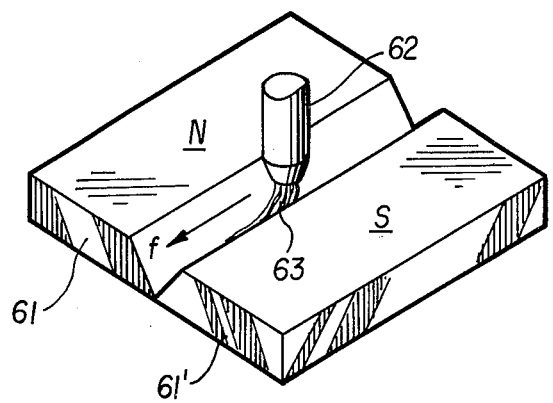
FIGS. 6 and 7 are perspective views of the concept of a magnetic arc blow.
Figure 7:
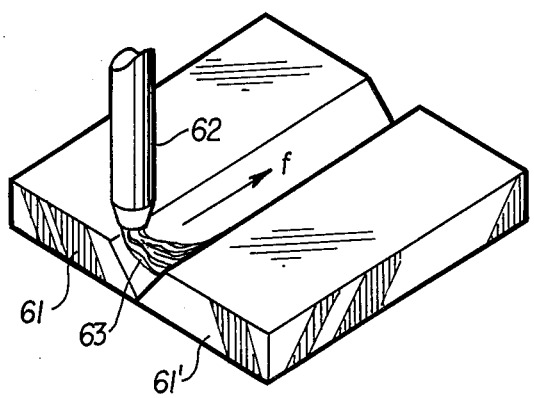

(2) When the TIG welding method is effected with a DC voltage source, the TIG arc is very sensitive to vairations in the surrounding magnetic field caused by magnetization and varied shape of material to be welded and the disabling weld state is brought about owing to a magnetic blow. By way of example, FIGS. 6 and 7 show in a perspective view the concept of magnetic blow states wherein FIG. 6 is an example of the magnetic blow due to magnetization of steel sheets 61 and 61', the base metal material, and FIG. 7 is an example of the magnetic blow due to variations in the shape of the steel sheets 61 and 61'. A tungsten electrode 62 (hereinafter referred to as "electrode") extends within grooves in the steel sheets 61 and 61' and the steel sheets 61 and 61' are respectively magnetized with the "N" and "S" poles, developing a magnetic field within the grooves. When, for example, a DC constant voltage source is interposed between the electrode 62 and the steel sheets 61 and 61', current flows in a direction normal to the magnetic field. In the case that the current has a positive polarity, an electromagnetic force is developed in the arrow direction f pursuant to the Fleming's left hand law to deflect an arc column 63, a flexible conductor, as depicted in the drawings. In FIG. 7. the steel sheets 61 and 61' are not magnetized and the electrode 62 is located near the edges of the steel sheets 61 and 61'. In this case the electromagnetic force is primarily oriented toward the steel sheets 61 and 61' to deflect the arc column 63 in the arrow direction f. FIGS. 6 and 7 depict the few examples of the magnetic blows.

Figures 8, 9:
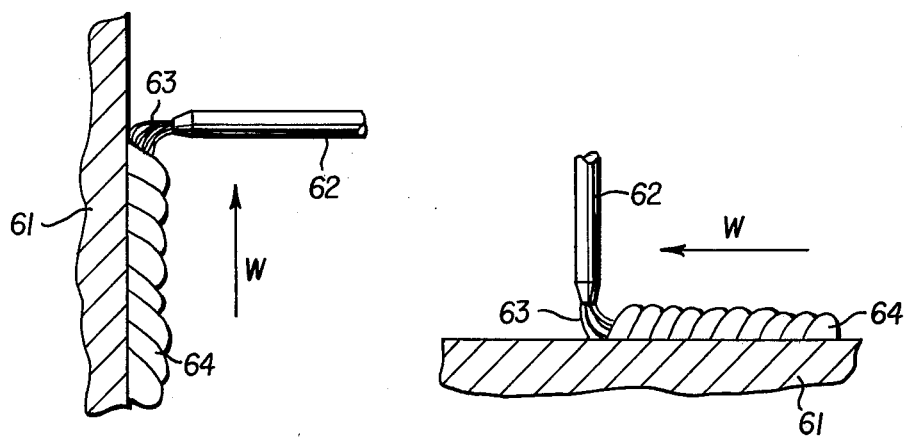
FIGS. 8 and 9 are schematic cross-sectional views of a weld zone.

FIGS. 8 and 9 illustrate actual situations in a weld spot wherein FIG. 8 is a cross sectional view showing upward oriented vertical position welding (W: the welding direction) and FIG. 9 shows lefthand flat position welding. In any case the arc column 63 is deflected toward the side where the amount of the steel material is large (that is, opposite to the welding advance direction). Under these circumstances the steel on which welding is about to be performed is hardly affected by the arc. As discussed above, preheating and melting are imperfect and inferior fusion occurs between the groove face of the base metal material and the deposited metal. The arc is developed on previously formed beads 64 as shown in FIGS. 8 and 9 so that the beads 64 are locally fused and become uneven in shape. With the upward oriented vertical position or the overhead position as depicted in FIG. 8, the weld metal may burn through due to overheating of the beads 64, thus disabling the next succeeding welding procedures.

With the foregoing in mind, the inventors have conducted studies on high speed welding conditions free of the above discussed problems and concluded that it is desirable to deflect the arc in the welding advance direction in an attempt to make good use of the magnetic blow phenomena. The inventors' attempt is summarized as follows:

In the DC TIG welding method, (1) DC voltage sources are connected between the non-consumable electrode and the base metal material and between the filler and the base metal material, respectively;

(2) flows of current therebetween are (a) same when the welding material is ahead of the electrode along the welding advance direction; and (b) opposite when the welding material is behind the electrode along the welding advance direction; and (3) the arc is directed toward the welding advance direction.

A few embodiments for meeting all the above requirements will be described by reference to the drawings.

Figure 10:
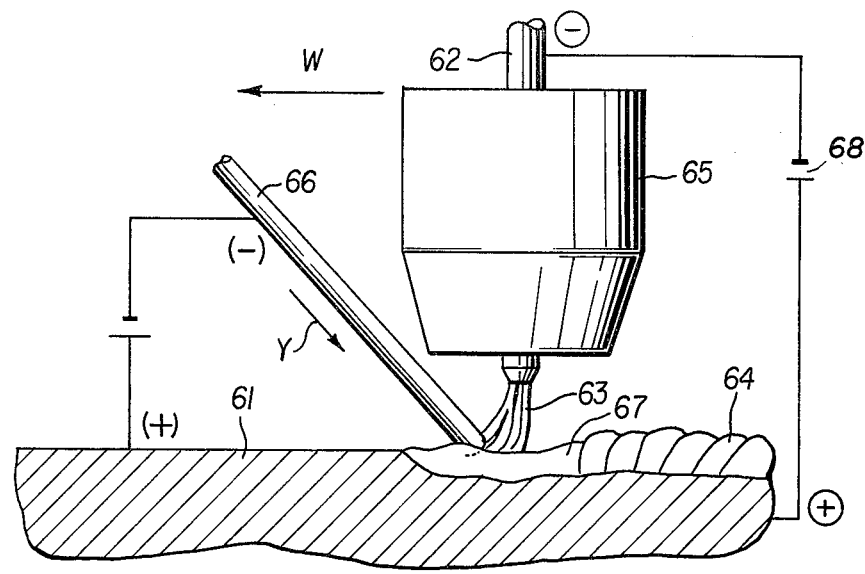
FIGS. 10 and 11 show side views of an embodiment of the present invention.

Referring to FIG. 10 showing a side view of a first embodiment, the filler wire 66 is located ahead of a shield gas cap 65 along the welding advance direction W and supplied in the arrow direction Y. As soon as the tip of the filler wire is immersed in the molten pool, it enters into the arc 63 being deflected. FIG. 10 is depicted with a straight polarity wherein the base metal 61 serves as an anode and the electrode 62 as a cathode with voltage source 68 disposed therebetween. Conduction current flows through the base metal 61 with the same polarity as the electrode 62 (the base metal 61: an anode and the filler wire 66: a cathode). If the flows of current through the electrode 62 and the welding material 66 are identical to each other in this manner, there are developed two magnetic fields which are attractive to each other so that the flexible arc column 63 is deflected toward the filler wire 66 and hence the welding advance direction as viewed from FIG. 10. The intensity of the magnetic field developing around the filler wire 66 and the degree of the deflection of the arc column are made variable by varying the amplitude of the conduction current into the filler wire 66.

Figure 1A:
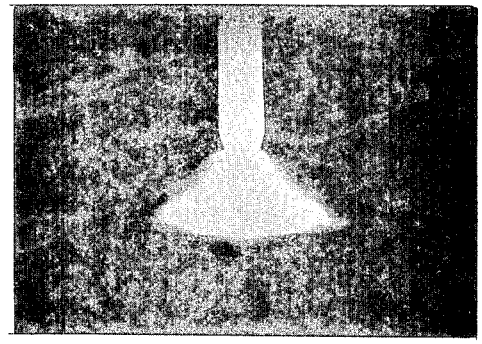
FIGS. 1A–1C show the arc deflecting states in connection with operation of the invention.

FIGS. 1(A), (B) and (C) dipict various arc deflection states when the DC voltage sources are connected as in FIG. 10. The tungsten electrode is conducting with 250 A and 15 V and the filler wire is conducting with 0 V (A), 100 A and 4 V (B) and 160 A and 6 V (C), separately. When the conduction current into the filler is zero (the normal condition of the TIG arc welding method), the arc is not deflected. In this case, the greater the amplitude of the conduction current into the filler wire, the greater the deflection angle of the arc.

Figure 11:
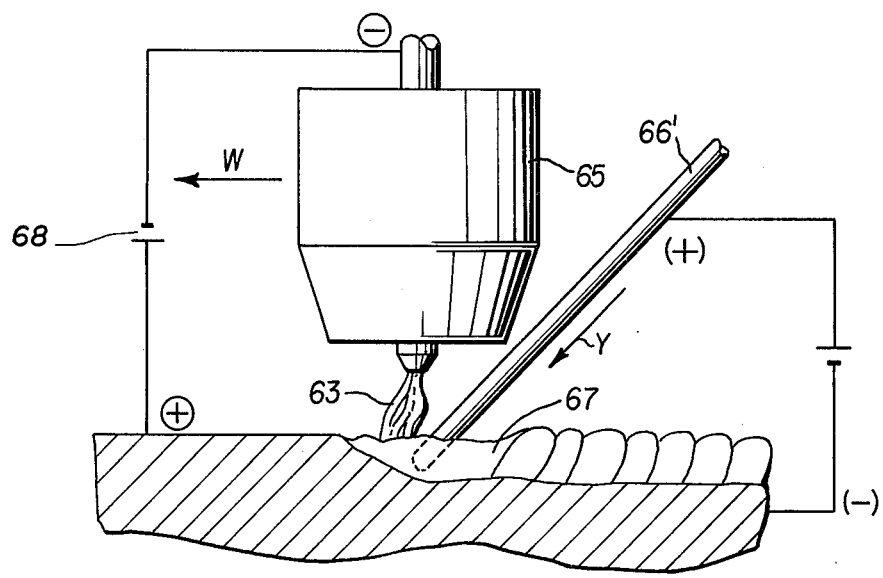

FIG. 11 shows another embodiment wherein the filler wire 66' is supplied from behind with respect to the welding advance direction and the filler wire 66' is supplied with conduction current with the filler wire 66' as an anode and the base metal 61 as a cathode, although the electrode 62 is of a positive polarity as is the case in FIG. 10. Therefore, the direction current into the filler wire 66' is opposite to that of current through the electrode 62 so that the two resulting magnetic fields repel each other to steer the arc column 63 away from the filler wire and thus toward the welding advance direction.

The closer the supply position of the filler wire is placed with respect to the nonconsumable electrode, the more the influence of the magnetic fields comes into effect. The above advantages may be expected with a very small amount of the conduction current.

The welding process according to the present invention as described above is advantageous as follows:

(1) the TIG arc can be directed ahead of the weld line;

(2) the direction force is easily adjustable by varying the amplitude of the conduction current into the filler wire;

(3) the region in front of the weld line is properly heated and comes to the molten state or nearly the molten state, thus completing the fusion of the filler wire;

(4) overheating of the deposited metal is avoided without damaging the appearance of the beads or burning through the deposited metal in overhead position welding or upward oriented vertical position welding; and (5) the temperature gradient in the weld zone increases gradually from before the arc to the arc point and decreases gradually from a fused metal region to a solidified metal region, thus enabling high speed welding without humping the beads.

Although the present invention overcomes the major problems inherent to the TIG welding method, the inventors' efforts have further been devoted to assuring the advantages of the present invention. In other words, improvements have been deemed necessary to enhance facility in fusing the weld metal into the base metal in welding with various welding positions and various steels and eliminate possible blow holes in high speed welding. Since the welding process is not the so-called hot wire method per se and the welding material is not heated, if the tip of the filler is moved away from the fused pool for any reason, then the filler wire will be thereafter conveyed onto the solidified beads to discontinue further welding procedures.

One powerful approach to solve the above problem is to weave the arc, but such is still disadvantageous in that:

(1) in the case of a mechanical method wherein a weaver mechanism is installed about a welding head, the overall construction is massive, bulky and difficult to carry and apply within a narrow space due to installation of the weaver, a motor, a slide base, etc.

(2) the above mechanical method generally needs a proper relative distance between the arc point and the tip of the filler wire. The welding torch and a filler wire guide are therefore mounted integrally on the slide base within the weaver but the relative distance therebetween varies unavoidably due to vibrations in the weaving operation. In some cases it becomes impossible for the filler wire to enter into the molten pool in a proper position.

(3) for another approach to develop a magnetic field through an electromagnet, it is required that the electromagnet be located as close to the arc point as possible. In the case of welding with thick sheet steels, the end of the electromagnet should be exposed into the grooves and exhibit an extreme high heat resistance since magnetic force may be centered on a steel of a good magnetic permeability. Satisfaction of these requisites is possible to a limited extent and the overall construction is large sized as set forth in the paragraph (1) even when a water cooling scheme is used at the same time.

In view of the foregoing, investigations have been conducted into the inherent characteristics of the TIG arc in the search for a new weaving method. The results of the investigations indicate that the pinch effect is slight since the nonconsumable electrode used with the TIG welding method is generally thick (say, 4 mm$\phi$) to reduce electrode consumption to a minimum and current density is lower than that in the MIG welding method (generally, approximately 1 mm$\phi$). In addition, since the rigidity of the arc is small in comparison with that of the MIG welding method (for example, an inert gas and a metal plasma), the TIG arc has great flexibility not comparable with that of the MIG arc. To take advantage of these inherent characteristics of the TIG arc, the magnetic fields used in the above disclosed welding process are varied in a fixed or variable rhythm by pulsating the conduction current into the filler wire, steering the TIG arc from a position a little ahead along the welding advance direction to a position beneath the nonconsumable electrode and vice versa. In this instance it is only necessary to pulsate the conduction current into the filler wire so that weaving welding needs no large sized and complex peripheral devices about the torch and is applicable to a narrow space. A similar technique for the MIG welding method is disclosed in Japanese Patent Publication No. 45/39931, for example. This technique employs a current carrying wire conductor other than a consumable electrode, feeds the conductor from behind the consumable electrode and determines flow of current through the consumable electrode and the conductor for deflecting the MIG arc forward along the welding advance direction. As noted earlier, the MIG arc is much less flexible than the TIG arc and thus more difficult to deflect forward, as a practical matter. However, occurrence of some difficulties are presumed in weaving the arc by the application of the pulsating current. The MIG welding method requires a considerable amount of conduction of current into the filler wire because of its high rigidity of the arc if it is desired to deflect the arc by conducting current into that portion of the filler wire being fed near the arc. Under such high current condition it is necessary to increase the feed speed of the filler wire or decrease the current density through the use of a filler wire thick in diameter, otherwise the filler wire becomes fused or an arc develops about the filler wire until the filler wire reaches the fusion pool. Whereas the MIG welding method suffers from the occurrence of the arc but is never unable to function the welding operation, the nonconsumable electrode is contaminated with metal vapor to an extent to substantially disable the welding operation. Therefore, measures to increase the feed speed of the filler wire and use the filler wire of a great dimension are still available but an increase in the amount of the weld metal necessarily leads to insufficient melting with the MIG welding method. The above described measures are difficult to adopt with the MIG welding method since the main arc penetrates deeply. In this way, with the MIG welding method it is very difficult to deflect the arc and in the case of the TIG welding method various conditions are carefully considered.

Figure 1B:
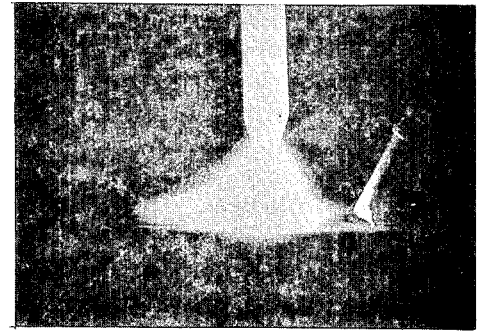
Figure 1C:
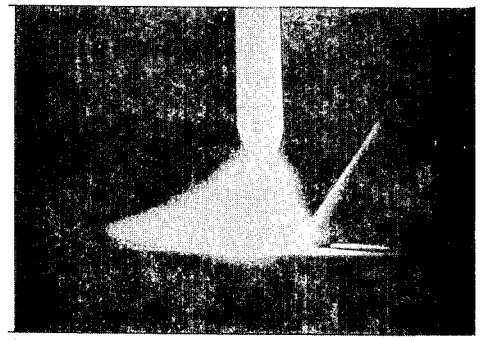

Although FIGS. 1A–1C are depicted with 250 A of the conduction current into the nonconsumable electrode, it is generally desirable that the current amplitude be 500 A or less since an excessive amount of current causes an increase in the current density and rigidity of the arc to thereby make deflection and weaving impossible. The electrode is conventionally supplied with constant current and, if desirable, is energized to develop a pulsating arc. The characteristics of the TIG arc per se are not intended to limit the scope of the present invention.

As is in the conventional combined MIG and TIG welding method or plasma MIG welding method, the conduction current into the filler wire should be low enough to avoid the operating situation where an arc develops from the filler wire in an operating state like a hot wire. Preferably, the conduction current is 200 A or less and the voltage at a projection of the welding wire is lower than the TIG arc voltage; otherwise the magnetic field is too intense and the TIG arc is blown off or blown out. In order that the operating state like the hot wire is avoided and the welding wire is certainly short-circuited with and brought into contact with the fusion pool, a higher wire feed speed is required. Furthermore, the problem of excessive deposited metal should be avoided.

As discussed above, the present welding process uses a weaving action by supplying pulsating current to the filler wire as shown in FIGS. 12A–12E. FIGS. 12A–12E depict waveforms of the pulsating current on the left side (A)–(E) and the arc deflecting states on the right side (A)–(D) while FIGS. 12F and 12G show an alternate embodiment of the invention. In examples (A)–(C) the conducting period alternates with the non-conducting period and, particularly in example (C), the nonconducting period is zero. In examples (D) and (E) the filler wire is always supplied with the welding current and high current (Ah) alternates with low current (Al) to form the pulsating current. (Th) represents the time period where high current flows and (Tl) the time period where the low current flows. It is understood that the deflection state of the arc column in each step is dependent on the amplitude of current. Example (E) indicates that current varies slightly for both the conducting period and the non-conducting period and the present invention is also applicable to this example. The weaving width (weaving angle) and the weaving cycle are freely selectable by proper selection of the various values (Ah), (Al), (Th) and (Tl), the weaving progress and the behavior at both ends of the weaving amplitude which are freely adjustable by varying the amplitude of the current. For example, when butt welding is carried out with the circumference of a pipe in a sequential fashion in vertial⇄horizontal⇄flat positions, the direction of gravity varies with respect to the molten pool so that the most desirable weaving pattern may be selected from time to time. This is one of the major advantages of the present invention.

Figure 12:
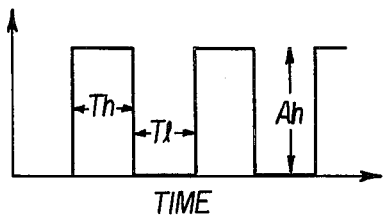
Figure 12:
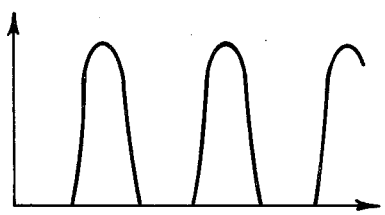
Figure 12:
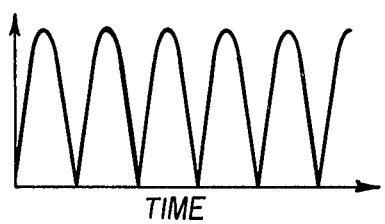
Figure 12:
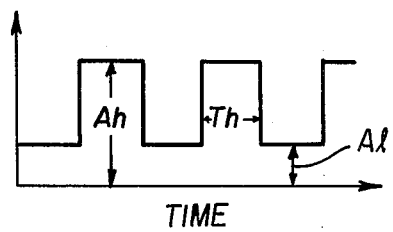
Figure 12:
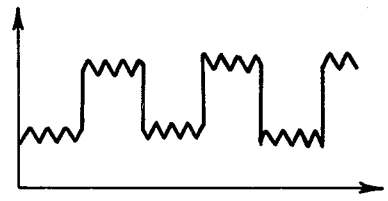
Figure 12:
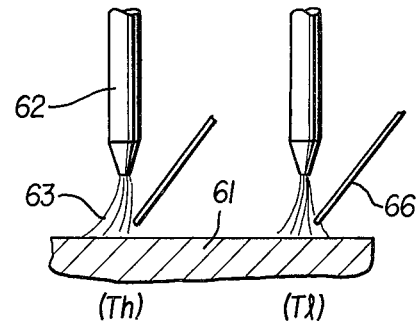
Figure 12:
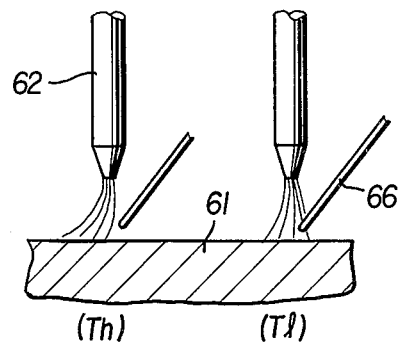
Figure 13:
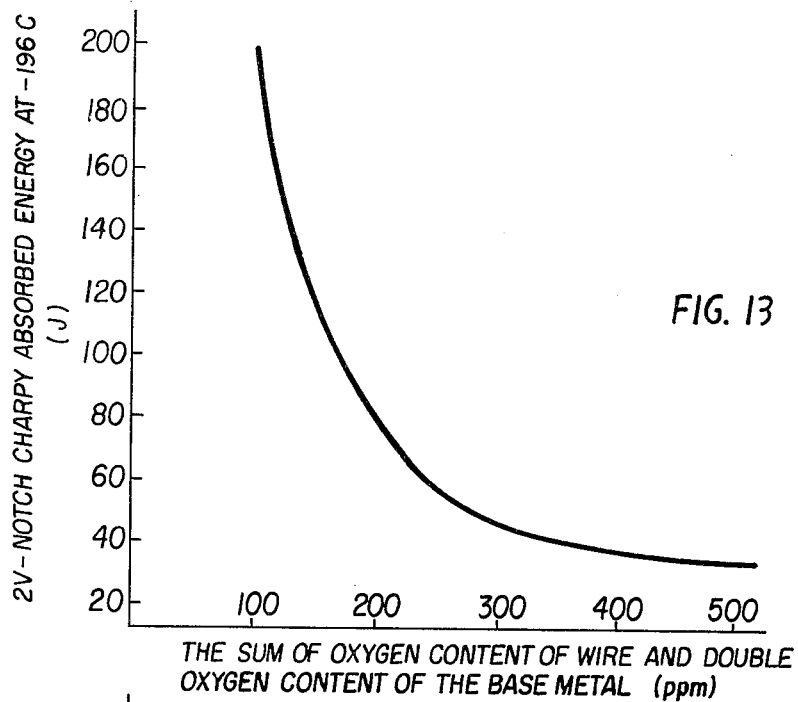
FIGS. 13 and 14 are graphs showing the relationship between the sum of the oxygen content and nitrogen content of a wire and double oxygen content and double nitrogen content of a base metal and the V notch absorption energy of a weld metal.
Figure 14:
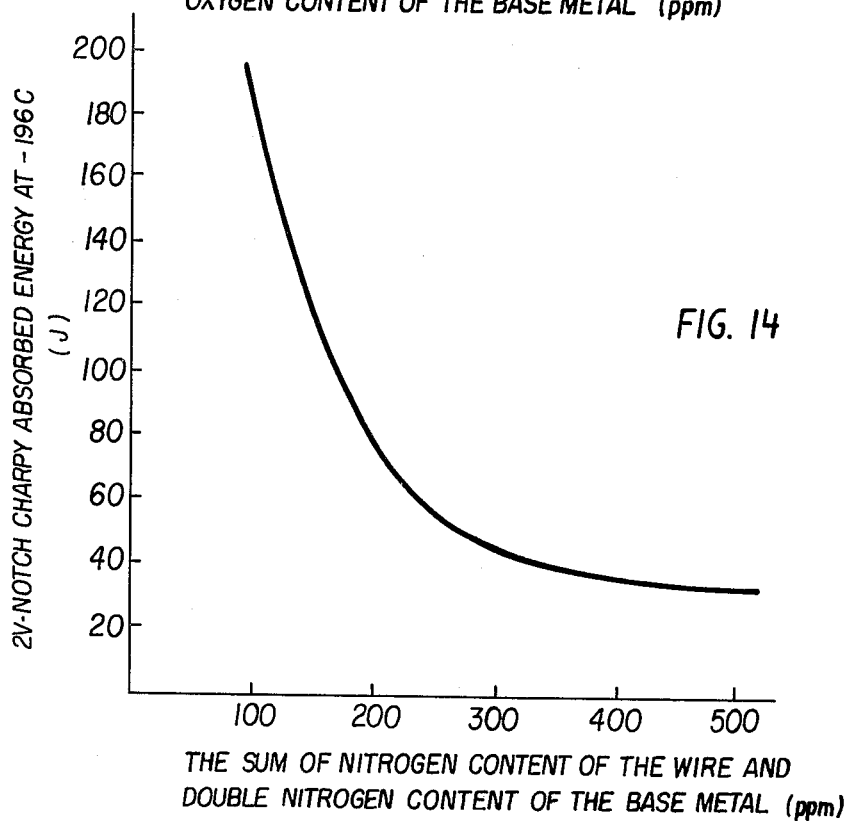

If unusual situations such as a variation in the groove root gap and an error in the root face are met along the weld line in the conventional one side backing welding method, then the amplitude of the TIG arc current is varied and the arc temperature, shape and size of the molten pool are also varied. To this end it is necessary to vary the melting rate of the filler wire and bring the TIG arc current into synchronism with the feeding rate of the filler wire. Such adjustment is rather laborsome but the welding process according to the present invention can cope with such unusual situations by merely varying the amplitude of the welding current in the filler wire with several measures being listed below:

(1) for example, when welding goes on in the pattern shown in FIG. 12 (A) and the root face becomes thicker, the back bead at that zone is difficult to go out as it is. If the amplitude of the high current (Ah) is increased for this reason, then the forward direction angle of the arc column increases and the arc acts directly on a groove root in a forehand non-deposited metal zone. As a result, melting of the root becomes sufficient and the back bead is completely formed;

(2) In conjunction with the above measure, if the conduction period of the filler wire is extended, the forward direction period of the arc also becomes longer so as to be enough to gain sufficient penetration;

(3) the above measures (1) and (2) are combined;

(4) the pattern is modified as viewed from FIGS. 12 (D) and 12 (E) and, if necessary, the current (Ah) is increased;

(5) the measures (2) and (4) are used together;

(6) the measures (4) and (5) are used together; and (7) several other measures are available through fine adjustment of those factors.

The welding process according to the present invention is successful in obtaining a subtle weaving pattern by applying pulsating current in the case that welding is effected with the DC straight polarity and the filler wire is fed from behind the nonconsumable electrode. It is only necessary to make identical the directions of the conducting currents in the case that the filler wire is fed from ahead of the nonconsumable electrode. Moreover, in the case of reverse polarity welding the directions of the conduction currents may be opposite to those of straight polarity welding. The present welding process is also applicable when the filler wire is fed before and after the nonconsumable electrode.

Satisfactory results are given in low-temperature toughness, tensile strength, etc. as long as the above requirements are fulfilled. One way to evaluate the mechanical strength of the resulting weld joints is to use small sized specimens such as the Charpy test. As long as such evaluation method is traced, there is no problem at all with the low-temperature characteristics of the joints made according to the requirements. However, a few problems still remain with the joints in the event that they are evaluated through the COD test which has proved to be an appropriate method for evaluating the brittle breakdown characteristics of welded building constructions. The inventors have revealed through extensive studies that such problems are attributable to the heat history of the final layer when multi-layer welding is carried out through the TIG welding method or the TIG plasma welding method. It has been concluded that the final layer is also to be given sufficient heat history. This is achieved, following multi-layer welding, by cooling the weld bead surface of the final layer below 150° C. and re-melting the final layer with the arc generated from the nonconsumable electrode while the final bead surface is shielded with an inert gas. Further details thereof will be set forth below.

The results of the inventors' experiments indicate that, when multi-layer welding is carried out on such a superlow-temperature steel as 9% nickel steel through the use of the welding wire including 8–15% of Ni, a central portion of the groove, that is, lower layers are influenced by the effects of heat treatment due to heat cycling during welding of upper layers, the effects of such heat treatment being effective in enhancing the low-temperature toughness of the lower layers. However, the final layer does not enjoy the benefit of such heat treatment and, as a result, the low-temperature toughness of the overall weld metal is decreased remarkably. This tendency is significant when the effects of heat treatment are extreme as is in eutectic alloy welding with Ni containing ferrite steels such as 9% nickel steel (grains become greater without difficulty because of Ni contained therein). If the bead surface of the eutectic alloy weld zone of the Ni containing steel is molten again with the nonconsumable electrode, then residual stress is remarkably reduced from the final layer and the low-temperature toughness of the overall weld metal is greatly improved.

A distinguishing feature of the welding process of the present invention is that an increase in low temperature toughness can be evaluated by the COD test which has proved to be more appropriate than the conventional Charpy test for evaluation of toughness at low temperatures or fracture toughness.

Although the welding process of the present invention using a Ni containing steel as the base metal will be set forth below, it is obvious that the present invention is also applicable to welding of other low temperature steels.

According to the present welding process, a joint of a superlow temperature steel containing Ni is multi-layer welded through the utilization of an eutectic alloy steel material containing 8–15% Ni by weight and subsequently subjected to re-fusion treatment.

The re-fusion treatment is intended to remove residual welding stress from the final finishing layer in the multi-layer weld zone and gives the weld metal low-temperature toughness through the treatment thereof. This treatment is accomplished by the arc heat from the nonconsumable electrode. The depth of penetration during the re-fusion treatment should be equal to or less than the depth of the final finishing layer. Otherwise, excessive penetration reduces the effect of the re-fusion treatment. As stated hereinbefore, the object of the re-fusion treatment is to eliminate residual welding stress on the final finishing layer and increase low-temperature toughness. For the purpose of the re-fusion treatment it is desirable that the depth of penetration during the re-fusion treatment be equal to or less than the depth of the final finishing layer. In the event that penetration is deeper than the final finishing layer during the re-fusion treatment, the re-fused beads become larger than the previous to suppress the effects of the re-fusion treatment. The re-fused zone is preferably more than half as wide as the final finishing layer in order to allow the whole of the joint to enjoy the desirable effects of the heat treatment. In the case that the refused zone is more than 1.3 times as wide as the final finishing layer, heat input becomes excessive and excessive influence of the heat occurs on the base metal.

Figure 18:
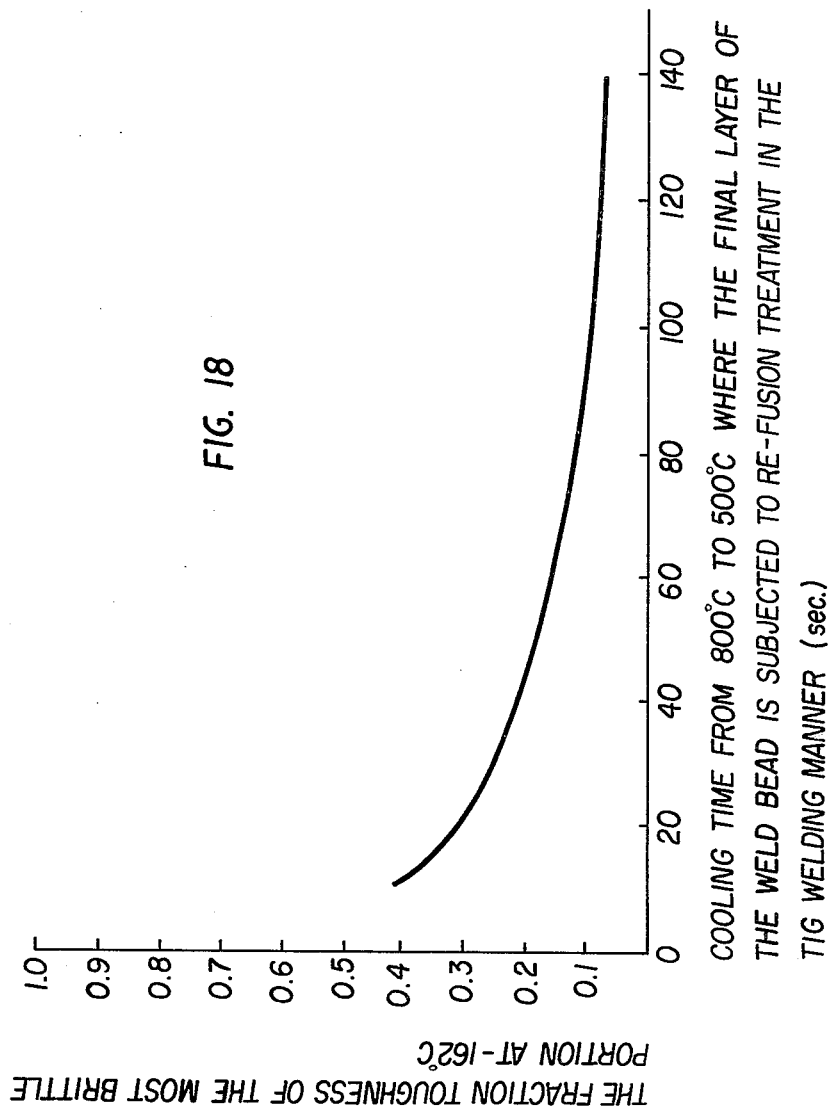
FIG. 18 is a graph showing the relationship between the cooling period and the breaking strength of a final layer during TIG welding.

In carrying out the re-fusion treatment the bead surface of the multi-layer weld zone should be air- or water-cooled below 150° C. In the event that the re-fusion treatment is carried out with a heat surface temperature over 150° C., the cooling rate decreases in the re-fused zone so that grains on the bead surface become coarse with a resulting reduction in low-temperature toughness. The bead surface is cooled below 150° C. once after completion of welding, then it is allowed to be cooled through heat release for a relatively brief period of time after the re-fusion treatment so that the bead surface shows a fine crystalline structure with an excellent low-temperature toughness. The reason why the cooling rate should not decrease after the re-fusion treatment is evident from analysis of FIG. 18. The beads are cooled gradually through heat release subsequent to the re-fusion treatment. In particular, when the length of time where the beads are cooled from 800° C. to 500° C. extends over 100 seconds, the COD value (the fracture toughness of the most brittle portion at −162° C.) becomes lower than 0.1. It is therefore preferable that the beads be cooled from 800° C. to 500° C. for a period of time of about 50 seconds. In other words, an excessive amount of welding heat input during the re-fusion treatment expands the heat affected zone, prolongs the cooling period and renders the crystal grains coarse, thereby preventing low-temperature toughness from increasing. While the re-fusion treatment goes on under the conditions that the nonconsumable electrode is made up of tungsten and the re-fused zone is shielded with an inert gas such as argon and helium, the amount of the shield gas supplied is preferably within the range of 10-100 l/min. A supply amount less than 10 l/min leads to various problems due to a lack of shielding and, on the other hand, an amount in excess of 100 l/min causes the flow of the shield gas to be disturbed and involved in the re-fused zone, resulting in the occurrence of joint defects such as bits.

A well known technique similar to the welding process of the present invention is disclosed in Japanese Patent Laid-open specifications Nos. 49/55538 and 49/66548. The former teaches "an attempt to prevent brittle fracture after welding by re-heating both the heat-affected zone and bond zone with the head radiated from the TIG arc" and is considered to be similar to the welding method in that post-treatment is carried out by the TIG arc heat after welding. However, both are totally different from each other in the following aspects:

(1) Whereas the object of the technique disclosed in laid-open publication No. 49/55538 is achieved by re-heating the heat-affected zone and bond zone, the welding process according to the present invention re-fuses the final finishing portion of the weld metal itself. The distinction results from the welding process according to the present invention serves to enhance the low-temperature toughness of the weld metal zone itself. In other words, according to the present invention using a superlow temperature steel as the base metal, it is necessary to increase the low-temperature toughness of the weld metal in order to gain joint performances comparable to the base metal. The heat treatment on only the heat affected zone and the bond zone as disclosed in publication No. 49/55538 is, however, not instrumental in achieving such object.

(2) The technique disclosed in publication No. 49/55538 achieves its major objects by merely re-heating without bringing the weld metal into the molten state, while the re-fusion treatment on the final finishing layer of the weld metal is essential for the welding process of the present invention. The second distinction is due to the fact that the present invention is applied to the welding of superlow-temperature steels and also the inventors' findings that the object of the present invention is impossible to achieve unless the re-fusion treatment is effected when a Ni containing steel is employed as the base metal material and the weld metal. In addition, publication No. 49/55538 suggests nothing about the concept of the present invention that the weld beads should be kept at a less than 150° C. temperature in the progress of the re-fusion treatment. This fact reflects essential differences in the objective and technical solution between the present invention and the disclosure of publication No. 49/55538.

On the contrary, laid-open publication No. 49/55538 suggests "an attempt to make smooth the bead surface by re-fusing the same with a TIG welding torch after MIG welding". It also sets forth that the technique disclosed herein prevents insufficient solution of the weld metal zone and joint deficits such as blow holes and undercuts and enhance joint strengths. There is further suggestion that such an attempt is applicable to the welding of a Ni containing steel. The only object that the attempt achieves is to make the bead surface smooth and has no relevancy to a technique for enhancing the low-temperature toughness of the weld metal zone.

The primary object of the present invention, on the other hand, is to enhance the low-temperature toughness of the final finishing layer in the weld metal zone. The present invention achieves its primary object by limiting the surface temperature of the weld beads below 150° C. and carrying out the re-fusing treatment. A variety of desirable conditions for the re-fusing treatment are also defined by the present invention. There is no disclosure about those criteria in publication No. 49/66548.

Eventually, the welding process of the present invention has the following advantages through the re-fusion treatment of the final finishing layer of the weld metal subsequent to eutectic alloy welding. A significant feature of the present invention resides in extended applications of superlow-temperature steels.

(1) The resulting joint and the base metal material exhibit substantially the same low-temperature toughness, thus enhancing the low-temperature toughness of the overall construction welded;

(2) The welding wire is economical because there is no need to use a high Ni steel;

(3) Both the joint and the base metal material are substantially the same in chemical composition and coefficient of thermal expansion, thus unifying mechanical strengths of the whole construction such as 0.2% strength and hot crack resistance without termal fatigue due to varying temperature;

(4) As a consequence, the whole construction is relatively thin and light in weight;

(5) It is only necessary to re-fuse the bead surface so that the welding procedures are simple and less expensive;

(6) The effects of the re-fusion treatment are surely attainable by merely keeping the surface temperature below 150° C. during the re-fusion treatment.

Although specific examples of the present invention will be described in detail, it is not intended to limit the present invention thereto. It is to be understood in view of the whole disclosure that many changes and modifications may be made and are intended to be included within the scope of the present invention.

EXAMPLE 1

Base metals whose composition is shown in Table 1 were prepared and provided with 60 degree grooves through gas cutting. After the removal of scales from the grooves with a grinder, the TIG welding was carried out under the conditions of Table 3 through the utilization of welding wires the composition of which is enumerated in Table 2. Welding was conducted in such a manner that the front side was first welded and, subsequent to arc air gouging on the groove root, the rear side was welded. An automatic TIG welding machine with an automatic arc control scheme was employed.

TABLE 1

9% nickel steel (sheet thickness 200mm)

| Symbol | C | Mn | Si | P | S | Ni | O | N |
|---|---|---|---|---|---|---|---|---|
| A | 0.06 | 0.42 | 0.21 | 0.012 | 0.004 | 9.2 | 20ppm | 25ppm |
| B | 0.06 | 0.34 | 0.31 | 0.006 | 0.004 | 8.9 | 115ppm | 130ppm |
| C | 0.04 | 0.31 | 0.25 | 0.005 | 0.006 | 9.0 | 100ppm | 110ppm |

TABLE 2

| Symbol | a | b | c | d | e |
|---|---|---|---|---|---|
| C | 0.08 | 0.02 | 0.06 | 0.07 | 0.03 |
| Mn | 0.45 | 0.64 | 0.24 | 0.72 | 0.42 |
| Si | 0.12 | 0.03 | 0.13 | 0.05 | 0.06 |
| P | 0.010 | 0.009 | 0.006 | 0.010 | 0.004 |
| S | 0.008 | 0.006 | 0.004 | 0.008 | 0.003 |
| Ni | 10.4 | 12.8 | 13.4 | 9.8 | 11.0 |
| Al | 0.04 | 0.06 | 0.01 | 0.01 | 0.01 |
| Ti | 0.01 | 0.02 | 0.008 | 0.01 | 0.01 |
| B | 0.0002 | 0.0003 | 0.0008 | 0.001 | 0.0002 |
| O | 70ppm | 60ppm | 140ppm | 220ppm | 75ppm |
| N | 60ppm | 80ppm | 250ppm | 150ppm | 60ppm |
| | Example | Example | Comparison example | Comparison example | Example |

TABLE 3

| (Welding conditions) | | |
|---|---|---|
| Welding position | Vertical | Horizontal |
| Curent (DC.SP) | 250A | 350A |
| Voltage | 12V | 14V |
| Welding rate | 5.5cm/min | 15.0cm/min |
| Welding heat input | 32.7KJ/cm | 19.6KJ/cm |
| Shield gas | argon | argon |
| Bath temperature difference | Max. 150° C. | Max. 150° C. |

Weldability was satisfactory in welding in both vertical and horizontal positions.

After welding all the examples were subject to tension test (JIS-Z-3112. A2; measured at room temperature), impact test (JIS-Z-3112, 4; measured at −196° C.) and side bend test (JIS-3122), the results thereof being listed in Table 4.

TABLE 4

| No. | 1 | 2 | 3 | 4 | 5 | 6 | 7 | 8 | 9 |
|---|---|---|---|---|---|---|---|---|---|
| Welding rate | a | a | b | c | c | b | a | d | e |
| Base metal | A | B | A | A | B | A | C | A | A |
| Welding position | Horizontal | Vertical | Vertical | Horizontal | Vertical | Horizontal | Vertical | Vertical | Horizontal |
| Oxygen in weld metal | 40ppm | 105 | 35 | 85 | 145 | 37 | 115 | 126 | 38 |
| Nitrogen in weld metal | 50ppm | 105 | 60 | 200 | 220 | 70 | 60 | 120 | 60 |
| 0.2% strength | 75kg/mm² | 81 | 68 | 74 | 77 | 64 | 75 | 77 | 78 |
| Tensile strength | 81kg/mm² | 86 | 79 | 82 | 94 | 78 | 84 | 87 | 86 |
| Stretch | 25% | 17 | 27 | 22 | 16 | 29 | 17 | 18 | 26 |
| Impact strength | 18.1kg/m | 4.8 | 19.7 | 6.3 | 3.8 | 20.8 | 5.5 | 4.3 | 19.2 |
| Side bend | Good | Poor | Good | Good | Poor | Good | Poor | Poor | Good |
| X-ray radiation | 1st grade (JIS) | 2nd | 1st | 1st | 3rd | 1st | 2nd | 3rd | 1st |
| Present invention | Yes | No | Yes | No | No | Yes | No | No | Yes |

The results of Table 4 can be analyzed as follows:

Nos. 1, 3, 6 and 9: examples within the requirements of the present invention were excellent not only in mechanical strengths such as tensile strength and impact strength but also in the results of X-ray radiation examination.

No. 2: this example (comparison example) contained considerable amounts of oxygen and nitrogen in the weld metal wherein both the oxygen and nitrogen content thereof are in excess of 100 ppm. The impact strength (low-temperature toughness) thereof was very poor and the side bend strength and the X-ray radiation results were also poor.

No. 4: the boron content of the welding wire (comparison example) exceeded 0.0006% with a relatively very low fracture strength. The nitrogen content of the wire was also too large.

No. 5: the boron content of the welding wire was too large and the oxygen and nitrogen content of the weld metal were both in excess of 100 ppm (comparison example) with unsatisfactory results in fracture strength, stretch and side bend strength along with poor results of X-ray radiation examination.

No. 7: while the oxygen contents of the filler wire and the base metal met the requirements of the present invention, the sum of the oxygen content (70 ppm) of the welding wire and the double oxygen content (100×2=200 ppm) of the base metal was in excess of 270 ppm (i.e., 70+200=270 ppm). Unsatisfactory results were given in fracture strength, side bend strength and X-ray examination.

No. 8: this example (comparison example) contained the oxygen content of the filler wire in excess of 200 ppm and the boron content thereof in excess of 0.0006% by weight. The fracture strength, the side bend strength and result of X-ray radiation examination were unsatisfactory.

Figure 15:
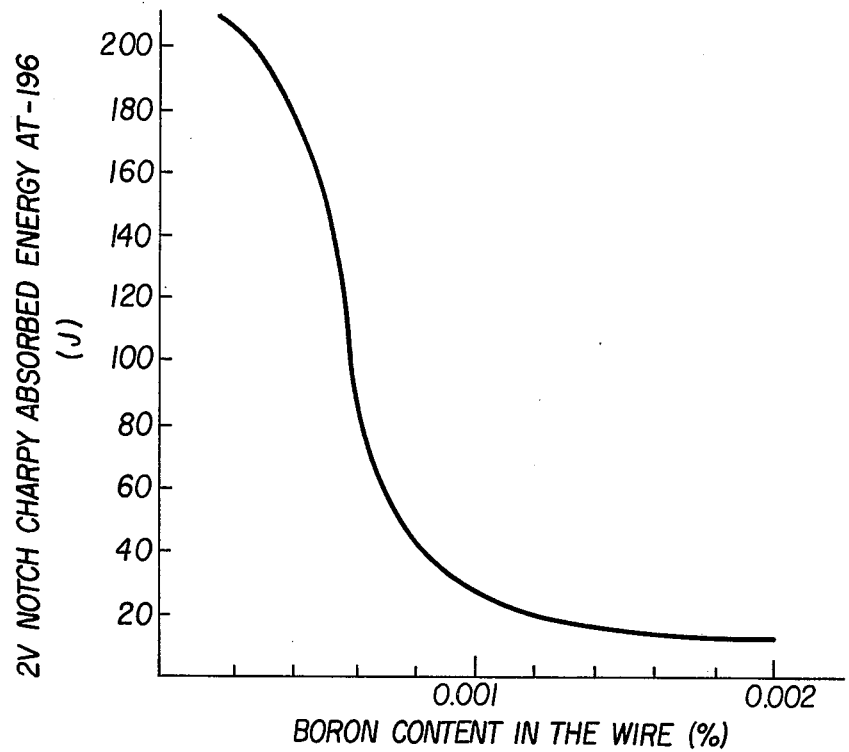
FIG. 15 is a plot of the impact resistance of a joint against the boron content of the wire.
Figure 16:
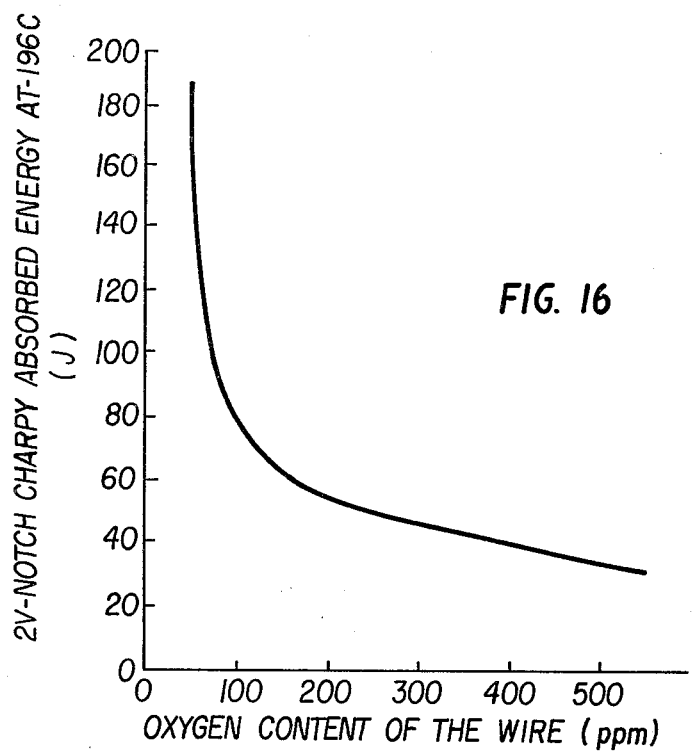
FIGS. 16 and 17 are graphs showing the relationship between the oxygen content and nitrogen content of a wire and the "V" notch absorption energy of a weld metal.
Figure 17:
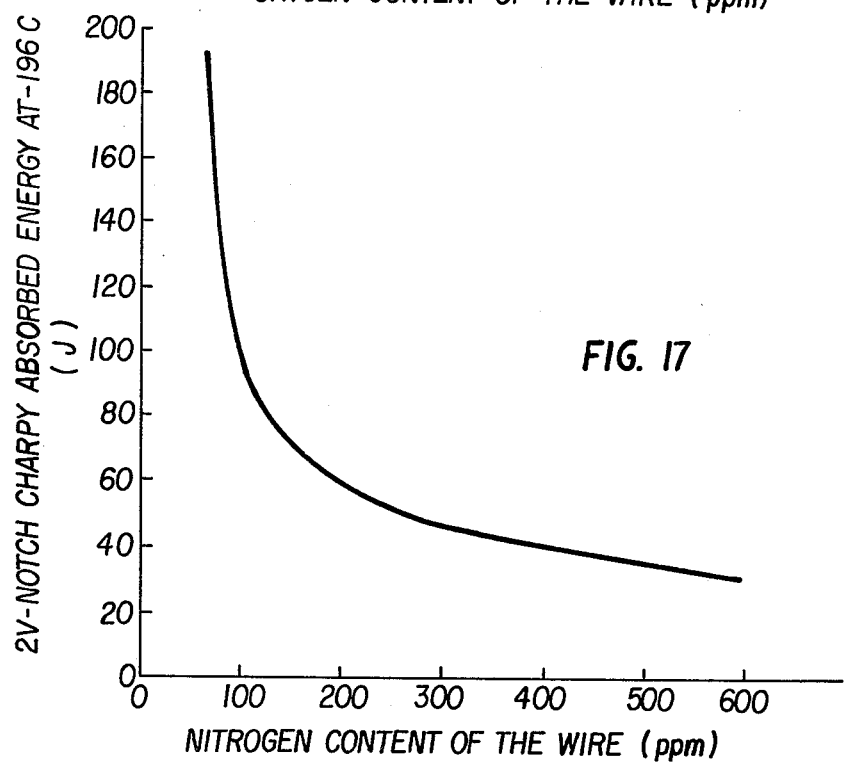

Subsequently, the impact strength of the resulting weld joint was measured at −196° C. when 9% nickel steel as denoted by the symbol A in Table 1 was used as the base metal material and the boron content of the welding wire was varied. FIG. 15 illustrates the results of such measurements indicating that the impact strength of the weld joint greatly decreased with the boron content in excess of 0.0006%. The welding wire exhibited a very high impact strength when the boron content was 0.0006% or less, particularly less than 0.0004%.

The following will discuss various exemplary welding conditions as required by the present invention. Unless provided otherwise, the wire used was the wire "a" of Table 2 in Example 1 and the base metal material used was the Ni steel "A" of Table 1.

EXAMPLE 2

A bead-on-plate was formed with the conditions of Table 5. An excellent appearance was obtained with a high speed of 60 cpm according to the present invention, whereas the conventional method resulted in a humping bead at a low speed of 40 cpm.

TABLE 5

|  | Conventional way | Present invention |
| --- | --- | --- |
| Welding current | 300A (DCSP) | Same |
| Welding voltage | 12V | Same |
| Welding rate | 40cm/min | 60cm/min |
| Filler wire | 1.2mmφ | Same |
| Wire feed direction | behind in relation with welding advance direction | Same |
| Wire conduction | Non-conduction | Conduction (60A): Opposite polarity |
| Shield gas | Pure Ar25l/min | Same |
| Tungsten | 3.2mmφ | Same |
| Base Metal | 12mmt | Same |

EXAMPLE 3

Figure 19:
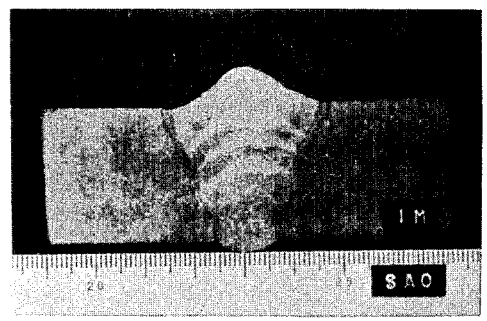
FIGS. 19 and 20 are photographs showing the joint welded according to the present invention.
Figure 20:
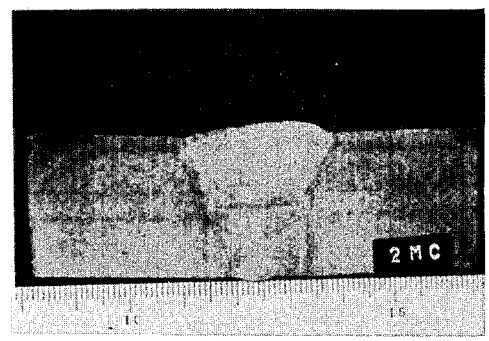

Upward vertical position welding was effected under the conditions of Table 6. FIG. 19 shows a bead cross sectional macroscopic structure at an end portion of a welded sheet according to the conventional method, while FIG. 20 shows the counterpart according to the present invention. The conventional method resulted in a significant convex bead configuration, whereas an excellent bead configuration was provided by the present invention.

TABLE 6

| Welding conditions | Conventional way | Present invention |
| --- | --- | --- |
| Welding current | 280A (DCSP) | Same |
| Welding voltage | 11V | Same |
| Welding rate | 4cm/min | 7cm/min |
| Filler wire | 1.2mmφ | Same |
| Wire feed direction | behind in relation with welding advance direction | Same |
| Wire conduction | Non-conduction | Conduction (60A): Opposite polarity |
| Shield gas | Pure Ar. 25l/min | Same |
| Tungsten | 3.2mmφ | Same |
| Base metal | 25mmt "V" groove | Same |

EXAMPLE 4

Figure 21:
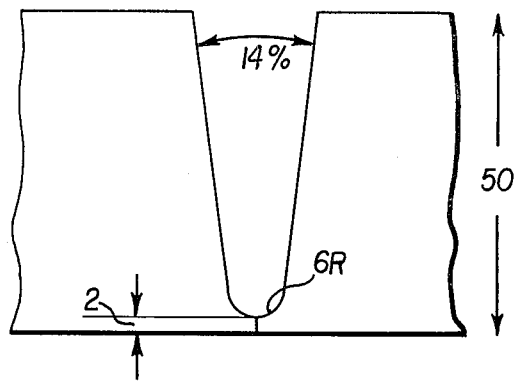
FIG. 21 is a representation of groove shapes used with the embodiment of the present invention.

Welding was carried out in all welding positions on a tube having a groove shape as shown in FIG. 21 under the conditions of Tables 7 and 8. While the conventional method provided a convex shaped bead in a flat position and a concave shaped in a vertical position, the present invention provided a homogeneous and clean bead in all positions.

TABLE 7

| Welding conditions | Conventional way | Present invention |
| --- | --- | --- |
| Welding current | 200A (DCSP) | Same |

TABLE 7-continued

| Welding conditions | Conventional way | Present invention |
| --- | --- | --- |
| Welding voltage | 11V | Same |
| Welding rate | 7cm/min | Same |
| Filler wire | 1.2mmφ | Same |
| Wire feed direction | Behind in relation with welding advance direction | Same |
| Wire conduction | Non-conduction | Conduction (Table 8) |
| Shield gas | Pure Ar 30l/min | Same |
| Base metal | 50mmt "U" groove | Same |

TABLE 8

| Tube position | | Time |
| --- | --- | --- |
| 1:30 ∫ 4:30 | Conduction period in one cycle | 0.4 sec |
| 4:30 | Non-conduction period in one cycle | 0.6 sec |
| 4:30 ∫ 7:30 | Conduction period in one cycle | 0.6 sec |
| 7:30 | Non-conduction period in one cycle | 0.4 sec |
| 7:30 ∫ 10:30 | Conduction period in one cycle | 0.4 sec |
| 10:30 | Non-conduction period in one cycle | 0.6 sec |
| 10:30 ∫ 1:30 | Conduction period in one cycle | Non-conduction |
| 1:30 | Non-conduction period in one cycle | |

EXAMPLE 5

Horizontal direction welding was carried out under the conditions of Table 9. While tubes made by the conventional way were located in JIS-1st class, 2nd grade (blow holes) from the results of X-ray transmittance test, the tubes according to the present invention were free of any defects (the groove shape and the procedures of forming deposited metal are viewed from FIG. 20).

TABLE 9

| Welding conditions | Conventional way | Present invention |
| --- | --- | --- |
| Welding current | 350A (DCSP) | Same |
| Welding voltage | 12V | Same |
| Welding rate | 13cm/min | 21cm/min |
| Welding wire | 1.6mmφ | Same |
| Wire feed direction | behind in relation with welding advance direction | Same |
| Wire conduction | Non-conduction | Periodic conduction |
| Shield gas | Pure Ar 50l/min | Same |
| Deposition procedure | Straight bead weaving | Straight + arc |
| Base metal | 25mmt | Same |

EXAMPLE 7

Commercially available 9% Ni steel of 20mm thick was provided with a 60° "V" shaped groove and the front surface side of the groove was multi-layer welded. Subsequently, arc air gouging was effected on the groove root and the rear surface side of the groove was welded. The chemical compositions of the 9% nickel steel used (base metal material) and the welding wire used are illustrated in Table 11 and the welding conditions in Table 12.

TABLE 11

|  | C | Mn | Si | P | S | Ni | Ti | Co | B | O (ppm) | N (ppm) |
| --- | --- | --- | --- | --- | --- | --- | --- | --- | --- | --- | --- |
| Filler wire | | | | | | | | | | | |

TABLE 11-continued

|   | C | Mn | Si | P | S | Ni | Ti | Co | B | O (ppm) | N (ppm) |
|---|---|----|----|---|---|----|----|----|---|---------|---------|
| A | 0.03 | 0.55 | 0.25 | 0.008 | 0.005 | 9.5 | — | 2.4 | 0.0004 | 75 | 60 |
| B | 0.04 | 0.68 | 0.05 | 0.004 | 0.004 | 12.3 | 0.03 | 3.5 | 0.0005 | 80 | 50 |
| Base metal | 0.06 | 0.38 | 0.25 | 0.007 | 0.008 | 9.5 | — | — | — | 30 | 50 |

(Unit: % by weight)

TABLE 12

| Welding method | Welding position | Current | Voltage | Date | Shield gas | Polarity |
|---|---|---|---|---|---|---|
| Automatic | Vertical | 300A | 10V | 70cm/min | Ar 25 l/min | DC-SP |

After the bead surface had been cooled below 100° C. upon the completion of welding, it was subjected to re-fusion treatment through the utilization of the TIG arc. The conditions for the re-fusion treatment are listed in Table 13, wherein the cooling rate is the length of time where the temperature falls from 800° C. to 500° C.

TABLE 13

| Condition | Cooling rate | Shield gas | Width of re-fusion zone | Depth of re-fusion zone |
|---|---|---|---|---|
| a | 50 sec | Ar. 25 l/min | ½ W | ½ t |
| b | 120 sec | Ar. 30 l/min | 1.0 W | ½ t |
| c | 70 sec | Ar. 30 l/min | ⅔ W | ½ t |
| d | 40 sec | Ar. 30 l/min | 1.3 W | ½ t | w: the width of the final finishing bead
T: the depth of the final finishing bead The resulting weld joints were subjected to impact test (JIS Z-3112; with a 4th Charpy test specimen and at −196° C.) and three-point bend COD test (BS standard DD-19; with fatigue notching added and at −196° C.), the results thereof being indicated in Table 14.

TABLE 14

| Welding Wire | Welding method | Re-fusion conditions | vE-196 (kg · m) | COD value (mm) | Remarks |
|---|---|---|---|---|---|
| B | Automatic TIG | a | 13.0 | 0.25 | Example X |
| B | Automatic TIG | b | 12.5 | 0.05 | Comparison Example X |
| B | Automatic TIG | c | 15.0 | 0.25 | Example Y |
| B | Automatic TIG | d | 18.0 | 0.30 | Example Z |
| B | Automatic TIG | Non re-fusion | 9.0 | 0.08 | Comparison Example Z |
| Blank (base metal) | — | — | 12.0 | 0.23 | — |

Analysis of the results of Table 14 reveals that, though the results of the Charpy test are not necessarily in agreement with the COD evaluation values, the low-temperature toughness of the joint subject to the re-fusion treatment according to the present invention was comparable with that of the base metal (examples X–Z) and relatively very high unlike comparison example Z (non re-fusion treatment). Comparison example X was made when the cooling rate was slow after the re-fusion treatment (Table 13). In this case the COD values indicative of low-temperature toughness were very low no matter how excellent the Charpy test results were. Comparison Y was made with a steel containing a large amount of Ni (the Ni content: 17.4%, Table 11) was employed as the welding wire and could not be expected to have the advantages of the present invention.

EXAMPLE 8

After welding had been carried out the same base metal, the same filler wire A, the same groove formation method and the same TIG welding conditions as Example 7, the re-fusion treatment was effected by varying the bead surface temperature (heat input: 45 KJ/cm, shield gas: Ar. 30 l/min, width of re-fusion zone: ⅔ W, and depth of re-fusion: ½ t). The results of the Charpy test and the Cod test on the resulting joints are depicted in Table 15.

TABLE 15

| Bead surface temp. (°C.) | vE-196 (kg/m) | COD value (mm) | Remarks |
|---|---|---|---|
| 100 | 15.0 | 0.25 | Example Y |
| 150 | 14.3 | 0.22 | Example O |
| 300 | 13.8 | 0.04 | Comparison example O |
| 450 | 4.7 | 0.02 | Comparison example P |

It is obvious from Table 15 that the bead surface temperature during the re-fusion treatment had great influences on low-temperature toughness. In other words, the present invention remained in effect when the temperature was 150° C. or less but a considerable reduction in low-temperature was experienced when the temperature exceeded 150° C. (comparison examples O and P).

What is claimed as new and desired to be secured by Letter Patent of the United States is:

1. A welding method for welding a base metal which comprises:
    welding said base metal with a welding wire wherein said base metal comprises 3.5%–9.5% nickel by weight, less than 100 ppm oxygen and less than 100 ppm nitrogen and said welding wire comprises 8–15% nickel by weight, 0.1–0.8% manganese by weight, less than 0.15% silicon by weight, less than 0.1% carbon by weight, less than 0.1% aluminum by weight, less than 0.1% titanium, less than 0.0006% boron by weight, less than 100 ppm oxygen and less than 100 ppm nitrogen, wherein the sum of the oxygen content of the wire and twice the oxygen content of the base metal is less than 200 ppm and the sum of the nitrogen content of the wire and twice the nitrogen content of the base metal is less than 200 ppm;
    feeding said wire into an arc column developed between a nonconsumable electrode and said base metal;
    deflecting said arc forward in the welding advance direction by the influence of magnetic fields resulting from the connection of both said nonconsumable electrode and said wire to a DC voltage source for DC TIG welding such that the directions of current flowing through said wire and said nonconsumable electrode are the same when said wire is ahead of said nonconsumable electrode along a welding advance direction, and deflecting said arc forward in the welding advance direction by the influence of magnetic fields resulting from the connection of both said nonconsumable electrode and said wire to a DC voltage source for DC TIG welding such that the directions of current flowing through said wire and said nonconsumable electrode are opposite when said weld wire is behind said nonconsumable electrode.

2. A welding method according to claim 1 which further includes the step of welding with DC straight polarity.

3. A welding method according to claim 1 which further includes the step of weaving the arc forward in the welding advance direction by pulsating the current flowing through the wire wherein said wire comprises a single wire.

4. A welding method according to claim 3 further including the step of:

pulsating current into a filler by alternating a period of conduction of current with a period of non-conduction through said filter.

5. A welding method according to claim 4 which further includes the step of varying a peak value of the conduction current.

6. A welding method according to claim 4 which further includes the step of varying either or both the conduction period and the non-conduction period.

7. A welding method according to claim 4 which further includes the step of varying the current value into the wire during the conduction period.

8. A welding method according to claim 3 further including the step of:

modulating a current flow through a filler such that a period of relatively large pulsating current flow alternates with a period of relatively small pulsating current flow.

9. A welding method according to claim 8 which further includes the step of varying either or both the large current conduction period and the small current conduction period.

10. A welding method according to claim 8 which further includes the step of varying either or both a peak value of the large conduction current into the filler and the counterpart of the small conduction current.

11. A welding method according to claim 3 which further includes the step of limiting the conduction current into the filler to $\leq 200$ A.

12. A welding method according to claim 3 which further includes the step of limiting the conduction current into the nonconsumable electrode to $\leq 500$ A.

13. A welding method according to claim 3 which further includes the step of applying a voltage to the wire which is lower than the voltage applied to the nonconsumable electrode.

14. A welding method according to claim 1, which further includes the step of feeding the wire into a molten metal and an arc atmosphere shielded with a pure inert gas.

15. A welding method according to claim 1 further including the steps of:

controlling automatically an arc length between said nonconsumable electrode and a weld metal by obtaining a signal through linear integration of a differential voltage between an arc voltage and a preset reference voltage; and sensing said differential voltage with an integrator element and transmitting said signal to an electrode drive motor such that said signal drives said drive motor thereby driving forward and backward said nonconsumable electrode with respect to said weld metal.

16. A welding method according to claim 15 wherein said signal is obtained through multiplication of said differential voltage.

17. A welding method according to claim 1 further including the step of:

controlling automatically an arc length between said nonconsumable electrode and a weld metal by stabilizing a differential voltage between an output voltage from an arc voltage detector and an output voltage from a reference voltage setting section via an arc voltage control, wherein automatic control of said arc length is effected by said arc voltage detector including an integrator element, said reference voltage setting section, said arc voltage control including an integrator and a multiplier, a motor control including an operator and a polarity decision element, and a drive section for driving said nonconsumable electrode by a motor.

18. The welding method for welding a base metal which comprises:

welding said base metal with a welding wire wherein said base metal comprises 3.5%–9.5% nickel by weight, less than 100 ppm oxygen and less than 100 ppm nitrogen and said welding wire comprises 8–15% nickel by weight, 0.1–0.8% manganese by weight, less than 0.15% silicon by weight, less than 0.1% carbon by weight, less than 0.1% aluminum by weight, less than 0.1% titanium, less than 0.0006% boron by weight, less than 100 ppm oxygen and less than 100 ppm nitrogen, wherein the sum of the oxygen content of the wire and twice the oxygen content of the base metal is less than 200 ppm and the sum of the nitrogen content of the wire and twice the nitrogen content of the base metal is less than 200 ppm;

feeding the wire into an arc column developed between a nonconsumable electrode and the base metal;

welding in multi-layers;

cooling a weld bead surface of a final layer below 150° C.; and refusing said weld bead surface with said nonconsumable electrode while shielding the same with an inert gas.

19. A welding method according to claim 18 which further includes the step of limiting the flow rate of the inert gas used for the re-fusion within the range of 10–100 l/min.

20. A welding method according to claim 18 which further includes the step of limiting the depth of penetration to be equal to or less than the thickness of the final layer during the re-fusion.

21. A welding method according to claim 18 which further includes the step of limiting the re-fusion zone to be 0.5 to 1.3 times as wide as weld beads including the weld bead center.

22. A welding the method according to claim 18 which further includes the step of applying heat input for re-fusion such that the temperature of the beads reaches from 800° C. to 500° C. within 100 seconds.

* * * * *

UNITED STATES PATENT AND TRADEMARK OFFICE
CERTIFICATE OF CORRECTION

PATENT NO. : 4,336,441
DATED : June 22, 1982
INVENTOR(S) : TOMOKAZU GODAI ET AL.

It is certified that error appears in the above-identified patent and that said Letters Patent is hereby corrected as shown below:

On the title page:
[30] -- Foreign Application Priority Data

"Oct. 27, 1978 [JP] Japan.....53/133004" should read

-- Oct. 27, 1978 [JP] Japan.....53/133005 --

In column 8, line 60, delete "inclues" and insert therefor --includes--;

In column 11, line 42, delete "dipict" and insert therefor -- depict--;

In column 12, line 5, delete "direction" and insert therefor -- directional--;

UNITED STATES PATENT AND TRADEMARK OFFICE
CERTIFICATE OF CORRECTION

PATENT NO. : 4,336,441

DATED : June 22, 1982

INVENTOR(S) : TOMOKAZU GODAI ET AL

It is certified that error appears in the above-identified patent and that said Letters Patent is hereby corrected as shown below:

In column 18, line 38, delete "termal" and insert therefor --thermal--;

In column 19, table 3, delete "Curent (DC.SP)" and insert therefor --Current (DC.SP)--

In column 23, table 14, delete "Blank (base metal" and insert therefor -- Blank (base metal)--;

In column 24, line 21, delete "Cod" and insert therefor --COD--;

In column 26, line 49, delete "refusing" and insert therefor -- re-fusing--.

Signed and Sealed this

Twenty-fourth Day of July 1984

[SEAL]

Attest:

GERALD J. MOSSINGHOFF

Attesting Officer

Commissioner of Patents and Trademarks